US010591811B2

(12) United States Patent
Tamura et al.

(10) Patent No.: US 10,591,811 B2
(45) Date of Patent: Mar. 17, 2020

(54) PROJECTOR AND CONTROL METHOD

(71) Applicant: SEIKO EPSON CORPORATION, Tokyo (JP)

(72) Inventors: Tetsuya Tamura, Matsumoto (JP); Kazunori Maeta, Matsumoto (JP)

(73) Assignee: SEIKO EPSON CORPORATION, Tokyo (JP)

(*) Notice: Subject to any disclaimer, the term of this patent is extended or adjusted under 35 U.S.C. 154(b) by 0 days.

(21) Appl. No.: 16/145,973

(22) Filed: Sep. 28, 2018

(65) Prior Publication Data
US 2019/0101812 A1 Apr. 4, 2019

(30) Foreign Application Priority Data
Sep. 29, 2017 (JP) .................. 2017-189828

(51) Int. Cl.
G03B 21/14 (2006.01)
G03B 33/12 (2006.01)
(Continued)

(52) U.S. Cl.
CPC ............. *G03B 21/147* (2013.01); *G03B 3/04* (2013.01); *G03B 21/005* (2013.01);
(Continued)

(58) Field of Classification Search
CPC ...... G03B 3/04; G03B 21/145; G03B 21/147; G03B 21/28; G03B 33/12; G03B 21/005; G03B 21/006
See application file for complete search history.

(56) References Cited

U.S. PATENT DOCUMENTS 7,237,903 B2* 7/2007 Nagayoshi ........... G09G 3/2092
348/747
7,887,195 B2* 2/2011 Odagiri ................ H04N 9/3185
353/69
(Continued)

FOREIGN PATENT DOCUMENTS

JP 2007-147681 A 6/2007
JP 2010-276895 A 12/2010
(Continued)

Primary Examiner — Bao-Luan Q Le
(74) Attorney, Agent, or Firm — Oliff PLC

(57) ABSTRACT

A projector includes light source, plurality of light modulation devices, light combining device integrated with the plurality of light modulation devices, projection optical device, posture adjustment device that adjusts posture of the light combining device, and control device that controls operation of the posture adjustment device, the posture adjustment device includes lead screw that changes posture of the light combining device, driver that rotates lead screw, shaft member to which rotation of lead screw is transmitted, potentiometer that detects amount of rotation of the shaft member, and photosensor that may be shielded by light shielding portion provided in the shaft member, and the control device includes abnormality determination unit that determines whether or not abnormality has occurred based on detection result by the potentiometer, and return operation unit that, if occurrence of abnormality is determined, returns the light combining device to original position based on detection result by the photosensor.

12 Claims, 20 Drawing Sheets

(51) Int. Cl.
*G03B 21/00* (2006.01)
*G03B 21/28* (2006.01)
*G03B 3/04* (2006.01)

(52) U.S. Cl.
CPC ......... *G03B 21/006* (2013.01); *G03B 21/145* (2013.01); *G03B 21/28* (2013.01); *G03B 33/12* (2013.01)

(56) References Cited

U.S. PATENT DOCUMENTS

| | | | |
|---|---|---|---|
| 8,152,313 B2* | 4/2012 | Amano | G03B 3/00 |
| | | | 348/745 |
| 9,372,481 B2 | 6/2016 | Matsutani | |
| 9,864,262 B2* | 1/2018 | Fujioka | H04N 9/3188 |
| 2005/0168698 A1* | 8/2005 | Nagayoshi | G09G 3/2092 |
| | | | 353/30 |
| 2006/0164612 A1* | 7/2006 | Chen | F16M 7/00 |
| | | | 353/119 |
| 2007/0013875 A1* | 1/2007 | Matsuoka | G03B 21/142 |
| | | | 353/70 |
| 2009/0279055 A1* | 11/2009 | Amano | G03B 3/00 |
| | | | 353/101 |
| 2015/0123589 A1 | 5/2015 | Matsutani | |
| 2016/0154294 A1* | 6/2016 | Fujioka | H04N 9/3188 |
| | | | 353/87 |

FOREIGN PATENT DOCUMENTS

| | | |
|---|---|---|
| JP | 2015-90307 A | 5/2015 |
| JP | 2016-30306 A | 3/2016 |

* cited by examiner

PROJECTOR AND CONTROL METHOD

BACKGROUND

1. Technical Field

The present invention relates to a projector and control method.

2. Related Art

In related art, projectors including light sources, light modulation devices that modulate lights output from the light sources and form images according to image information, and projection optical devices that enlarge and project the formed image on projected surfaces are known.

As a light modulation device employed for the projector, a liquid crystal panel is exemplified.

Further, a projector in which a projection lens unit corresponding to the projection optical device is detachably formed is known (for example, see Patent Document 1 (JP-A-2010-276895)).

When the placement of the projection optical device and the light modulation device such as the liquid crystal panel is not appropriate, there is a problem that displayed images are deteriorated. For example, when one of the projection optical device and the light modulation device tils relative to the other, a phenomenon called one-sided blurring that at least one of the left, right, upper, and lower parts in the projected image is blurred is likely to occur. The higher the resolution of the displayed image, the more remarkable one-sided blurring.

To address the problem, employment of a mechanism tilting the projection optical device relative to the light modulation device is considered. However, since the projection optical device is heavier and higher rigidity is required for the mechanism, and there are problems of not only upsizing of the mechanism but also power consumption increase, weight increase, and manufacturing cost increase.

On the other hand, a posture adjustment device that suppresses generation of the one-sided blurring by tilting an image formation unit in which a plurality of light modulation devices and a light combining device that combines luminous fluxes passing through the plurality of light modulation devices are integrated relative to a plane orthogonal to the optical axis of the projection optical device is conceivable.

As the configuration of the posture adjustment device, a configuration in which a lead nut rotated integrally with the light combining device is placed off the rotation axis of the light combining device, and a lead screw that meshes with the lead nut is placed in parallel to the direction orthogonal to the rotation axis is considered. In the configuration, when the lead screw is rotated by a driver, the light combining device and thus the image formation unit is rotated around the rotation axis.

Here, as the driver, a stepping motor that rotates according to input pulses is considered. However, regarding the stepping motor, an abnormality called step out that rotations in response to the number of pulses are not performed and synchronization of the number of input pulses and the motor rotation is lost may occur due to application of excessive load or the like. Or, if any failure occurs, it may be impossible to orient the image formation unit as an object of rotation in an appropriate posture.

Even when these abnormalities occur, if a configuration that detects the position of the lead screw using an absolute encoder is employed, the current posture may be grasped and, for example, after returning to the original position, the posture of the object of rotation may be newly changed.

However, the absolute encoder is relatively expensive and the posture adjustment device is likely to be expensive.

On the other hand, employment of a potentiometer in place of the absolute encoder is conceivable, however, the potentiometer largely varies in detection. Accordingly, for example, when an abnormality occurs, if returning to the original position of the object of rotation is tried depending on the detection result by the potentiometer, it may be impossible to correctly return the object.

SUMMARY

An advantage of some aspects of the invention is to provide a low-cost projector and a control method that can reliably return an object of movement to an original position.

A projector according to a first aspect of the invention includes a light source, a plurality of light modulation devices that respectively modulate lights output from the light source, a light combining device integrated with the plurality of light modulation devices and combining the lights entering from the respective plurality of light modulation devices, a projection optical device that projects the light combined in the light combining device, a posture adjustment device that adjusts a posture of the light combining device, and a control device that controls operation of the posture adjustment device, the posture adjustment device includes a lead screw that changes the posture of the light combining device, a driver that rotates the lead screw, a shaft member to which a rotation of the lead screw is transmitted, a potentiometer that detects an amount of rotation of the shaft member, and a photosensor including a light receiving portion that may be shielded according to a rotation of the shaft member by a light shielding portion provided in the shaft member, and the control device includes an abnormality determination unit that determines whether or not an abnormality has occurred in the posture adjustment device based on a detection result by the potentiometer, and a return operation unit that, if the abnormality determination unit determines that an abnormality has occurred, drives the driver and returns the light combining device to an original position based on a detection result by the photosensor.

Note that, as the driver, an actuator such as a stepping motor can be exemplified.

According to the configuration, if the above described failure such as step out occurs in the driver and the light combining device is rotated beyond an assumed range, these abnormalities can be detected based on the detection results by the potentiometer. If the abnormality determination unit determines that the abnormality has occurred, the return operation unit grasps the rotation state of the shaft member to which the rotation of the lead screw is transmitted based on the detection result by the photosensor, and returns the light combining device to the original position. Accordingly, the above described abnormalities can be detected by the relatively inexpensive potentiometer without using the absolute encoder, and the light combining device can be accurately returned to the original position for which the position at factory shipment or the center position in the movement range is exemplified based on the detection result by the relatively inexpensive and highly accurate photosensor. Therefore, if an abnormality occurs, an object of movement can be reliably returned to the original position, and further, the manufacturing cost of the projector can be suppressed.

In the first aspect, it is preferable that the return operation unit drives the driver to execute an origin return procedure of moving the light combining device to the original position by rotating the shaft member by a prescribed amount as a prescribed amount of rotation from a change position where a shielded state in which the light receiving portion is shielded by the light shielding portion of the shaft member and a non-shielded state in which the light receiving portion is not shielded are switched.

According to the configuration, the shaft member is placed in the change position, then, the shaft member is rotated by the prescribed amount, and thereby, the light combining device can be reliably returned to the original position.

In the first aspect, it is preferable that the return operation unit executes a predetermined amount rotation procedure of rotating the shaft member by a predetermined amount of rotation, and a reverse movement procedure of reversing a direction of the rotation of the shaft member and positioning the shaft member in the change position based on the detection result by the photosensor after the predetermined amount rotation procedure, and the unit executes the origin return procedure after execution of the reverse movement procedure.

According to the configuration, detection variations of the photosensor depending on the rotation direction (operation direction) can be suppressed by a to-and-fro rotation of the shaft member. Further, in the origin return procedure, the shaft member is rotated from the change position by the prescribed amount, and thereby, the light combining device can be reliably returned to the original position.

In the first aspect, it is preferable that the return operation unit executes a change position movement procedure of positioning the shaft member in the change position based on the detection result by the photosensor, and the unit executes the predetermined amount rotation procedure after execution of the change position movement procedure.

According to the configuration, the shaft member can be accurately placed in the change position based on the detection result of the photosensor, and thereby, the light combining device can be accurately returned to the original position.

In the first aspect, it is preferable that the return operation unit drives the driver to position the light combining device to a vicinity of the original position based on the detection result by the potentiometer before the change position movement procedure.

According to the configuration, for example, if an abnormality has occurred in the photosensor, the return operation unit can position the light combining device to the vicinity of the original position based on the detection result by the potentiometer even when the unit is adapted not to perform the change position movement procedure or origin return procedure.

In the first aspect, it is preferable that the control device includes a prescribed amount memory part that stores the prescribed amount, and the return operation unit acquires the prescribed amount stored in the prescribed amount memory part and executes the origin return procedure.

According to the configuration, for example, the prescribed amount is acquired and the prescribed amount is stored in the prescribed amount memory part in advance in a factory or the like, and thereby, the procedure can be performed and the light combining device can be reliably returned to the original position.

In the first aspect, it is preferable that the control device includes an abnormality memory part that stores details of an abnormality that has occurred, and, if a determination that an abnormality has occurred in the posture adjustment device is made, the return operation unit stores details of the abnormality that has occurred in the abnormality memory part.

According to the configuration, for example, in the case where the photosensor is effective, but the motor and the potentiometer are not effective, occurrence of abnormalities in the motor and the potentiometer can be stored. Or, in the case where the motor and the potentiometer are effective, but the photosensor is not effective, occurrence of an abnormality in the photosensor can be stored. Therefore, the cause of the occurring abnormality can be easily analyzed.

In the first aspect, it is preferable that the original position is a center position in a movement range of the light combining device by the posture adjustment device.

According to the configuration, the light combining device can be reliably returned to the state before posture adjustment by the posture adjustment device.

In the first aspect, it is preferable that the posture adjustment device includes a first pulley integrally provided to the lead screw, a second pulley integrally provided to the shaft member, and a transmission member that transmits a rotation of the first pulley to the second pulley.

According to the configuration, the rotation of the lead screw is transmitted to the shaft member via the first pulley, the transmission member, and the second pulley, and the rotation of the shaft member is detected by the potentiometer and the photosensor. Accordingly, the amount of rotation of the lead screw that changes the posture of the light combining device can be reliably detected by the potentiometer and the photosensor placed in the positions apart from the lead screw. Therefore, the degree of freedom of placement of the potentiometer and the photosensor can be improved.

In the first aspect, it is preferable that the second pulley increases a speed of the rotation of the first pulley transmitted via the transmission member.

According to the configuration, the rotation state of the shaft member can be easily detected by the potentiometer and the photosensor, and the detection accuracy of the rotation state of the lead screw and thus the posture of the light combining device can be improved. Therefore, the posture of the light combining device as an object of posture adjustment can be detected in more detail.

A control method according to a second aspect of the invention is a control method executed by a control device of a projector, and the projector includes a light source, a plurality of light modulation devices that respectively modulate lights output from the light source, a light combining device integrated with the plurality of light modulation devices and combining the lights entering from the respective plurality of light modulation devices, a projection optical device that projects the light combined in the light combining device, a posture adjustment device that adjusts a posture of the light combining device, and a control device that controls operation of the posture adjustment device, the posture adjustment device includes a lead screw that changes the posture of the light combining device, a driver that rotates the lead screw, a shaft member to which a rotation of the lead screw is transmitted, a potentiometer that detects an amount of rotation of the shaft member, and a photosensor including a light receiving portion that can be shielded according to a rotation of the shaft member by a light shielding portion provided in the shaft member, and the control method includes determining whether or not an abnormality has occurred in the posture adjustment device based on a detection result by the potentiometer, and, if the determination that the abnormality has occurred is made, driving the driver and returning the light combining device to an original position based on a detection result by the photosensor.

The control device of the projector performs the control method according to the second aspect, and thereby, the same advantages as those of the projector according to the first aspect can be offered.

A control method according to a third aspect of the invention is a control method executed by a control device of a projector, the projector includes a light source, a plurality of light modulation devices that respectively modulate lights output from the light source, a light combining device integrated with the plurality of light modulation devices and combining the lights entering from the respective plurality of light modulation devices, a projection optical device that projects the light combined in the light combining device, a posture adjustment device that adjusts a posture of the light combining device, and a control device that controls operation of the posture adjustment device, the posture adjustment device includes a lead screw that changes the posture of the light combining device, a driver that rotates the lead screw, a shaft member to which a rotation of the lead screw is transmitted, a potentiometer that detects an amount of rotation of the shaft member, and a photosensor including a light receiving portion that can be shielded according to a rotation of the shaft member by a light shielding portion provided in the shaft member, and the control method includes returning the light combining device to an original position by rotating the shaft member by a prescribed amount as a prescribed amount of rotation from a change position where a shielded state in which the light receiving portion is shielded by the light shielding portion of the shaft member and a non-shielded state in which the light receiving portion is not shielded are switched based on a detection result by the photosensor.

The control device of the projector performs the control method according to the third aspect, and thereby, the same advantages as those of the projector according to the first aspect can be offered.

BRIEF DESCRIPTION OF THE DRAWINGS

The invention will be described with reference to the accompanying drawings, wherein like numbers reference like elements.

DESCRIPTION OF EXEMPLARY EMBODIMENTS

Schematic Configuration of Projector

As below, one embodiment of the invention will be explained with reference to the drawings.

Figure 1:
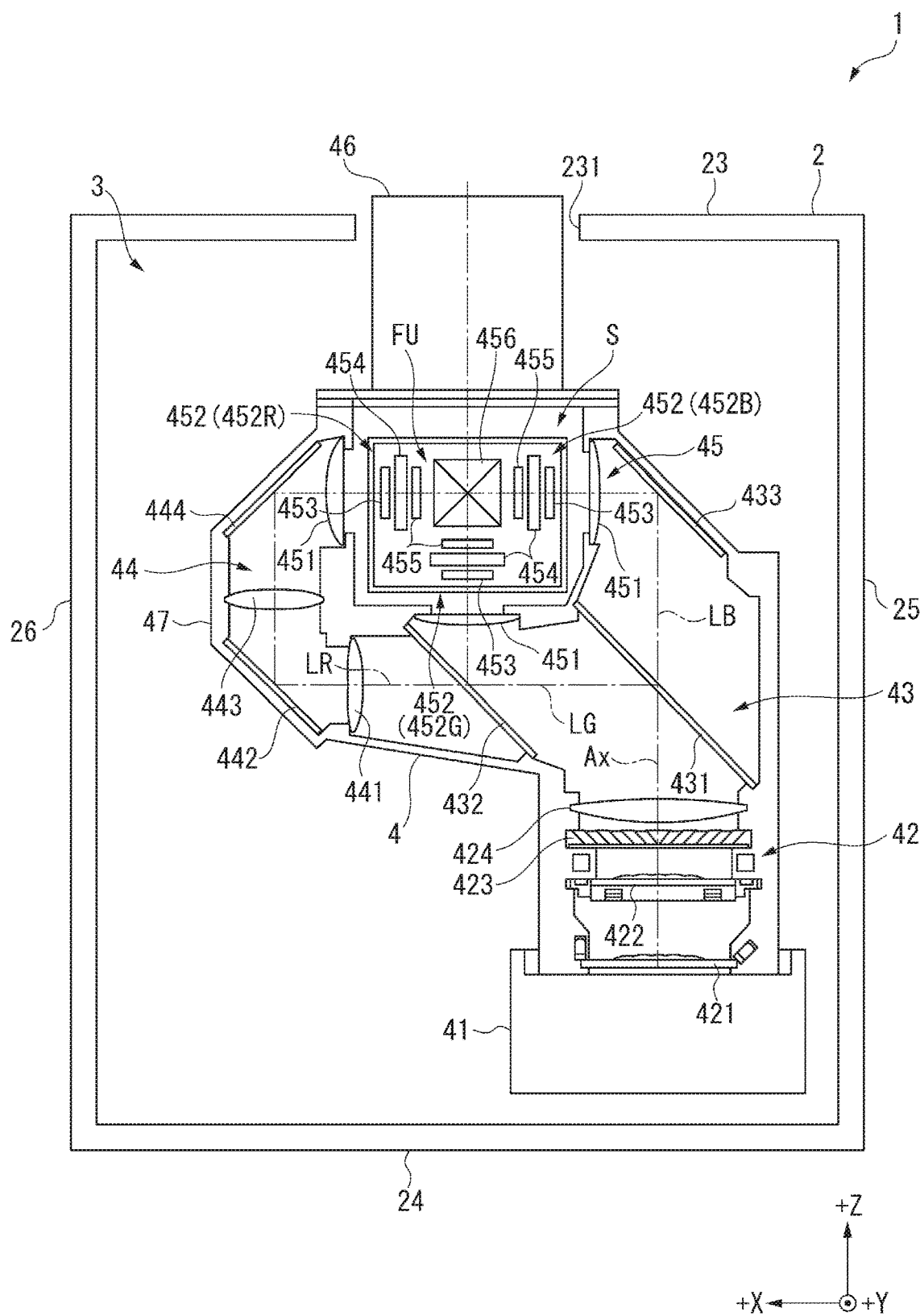
FIG. 1 is a schematic diagram showing a configuration of a projector according to one embodiment of the invention.

FIG. 1 is a schematic diagram showing a configuration of a projector 1 according to the embodiment.

The projector 1 according to the embodiment is a projection-type display apparatus that modulates light output from a light source 41 provided inside and forms an image according to image information and enlarges and projects the image on a projected surface such as a screen. As shown in FIG. 1, the projector 1 includes an exterior housing 2 forming an exterior, and an apparatus main body 3 housed within the exterior housing 2. The projector 1 has one of features with respect to control of a posture adjustment device 5 (see FIG. 2) that adjusts a posture of an image formation unit (FU), which will be described later in detail.

As below, the configuration of the projector 1 will be described in detail.

Configuration of Exterior Housing

The exterior housing 2 is formed in a nearly rectangular parallel piped shape. The exterior housing 2 has a front surface part 23, a rear surface part 24, a left side surface part 25, and a right side surface part 26, and further has a top surface part connecting one sides of these surface parts 23-26 and a bottom surface part connecting the other sides of these surface parts 23-26 (not shown). Note that the bottom surface part is a surface facing the installation surface of the projector 1 and a plurality of leg portions are provided thereon.

Further, the front surface part 23 has an opening portion 231. Apart of a projection optical device 46, which will be described later, is exposed via the opening portion 231, and an image is projected by the projection optical device 46.

Configuration of Apparatus Main Body

The apparatus main body 3 includes an image projection device 4. Further, the apparatus main body 3 includes a control device 9 (see FIG. 17) that controls the operation of the projector 1, and further includes a power source device that supplies electric power to electronic components forming the projector 1 and a cooling device that cools an object to be cooled forming the projector 1.

Of the devices, the configuration of the control device 9 will be described later in detail.

Configuration of Image Projection Device

The image projection device 4 forms an image according to image information (including image signals) input from the control device 9, and projects the image on the projected surface. The image projection device 4 includes the light source 41, a homogenization device 42, a color separation device 43, a relay device 44, an image formation device 45, the projection optical device 46, and an optical component casing 47.

The light source 41 outputs illumination light to the homogenization device 42. As a configuration of the light source 41, e.g. a configuration including a solid-state light source such as an LD (Laser Diode) that outputs a blue light as a light source light, and a wavelength conversion element that wavelength-converts a part of the blue light output from the solid-state light source into a fluorescent light containing a green light and a red light may be exemplified. Note that, as another configuration of the light source 41, a configuration including a light source lamp such as an ultrahigh pressure mercury lamp as a light source or a configuration including another solid-state light source such as an LED (Light Emitting Diode) may be exemplified.

The homogenization device 42 homogenizes the illuminance of the luminous fluxes entering from the light source 41. The homogenization device 42 includes a first lens array 421, a second lens array 422, a polarization conversion element 423, and a superimposing lens 424. Note that the homogenization device 42 may further include a dimmer that shields a part of the incident luminous fluxes and adjusts the amount of output light and various filters.

Of the elements, the polarization conversion element 423 converts the luminous fluxes entering from the second lens array 422 into one type of linearly-polarized lights and outputs the lights.

The color separation device 43 separates a red light LR, a green light LG, and a blue light BL from the luminous fluxes entering from the homogenization device 42. The color separation device 43 includes a dichroic mirror 431 that reflects the red light LR and the green light LG and passes the blue light BL, a dichroic mirror 432 that passes the red light LR and reflects the green light LG, and a reflection mirror 433 that reflects the separated blue light BL toward a blue field lens 451. Note that the green light LG reflected by the dichroic mirror 432 is entered into a green field lens 451.

The relay device 44 includes a light-incident side lens 441, a reflection mirror 442, a relay lens 443, and a reflection mirror 444 respectively provided in the optical path of the red light LR passing through the dichroic mirror 432, and guides the red light LR to a red field lens 451. Note that, in the embodiment, the image projection device 4 has the configuration in which the red light LR passes through the relay device 44, however, may have a configuration in which e.g. the blue light LB passes through the device.

The image formation device 45 modulates the respective color lights separated by the color separation device 43 with respect to each color light and combines the modulated respective color lights, and thereby, forms an image according to the image information. The image formation device 45 includes the field lenses 451 and light modulation devices 452 provided for the three color lights LR, LG, LB and a single light combining device 456.

The light modulation devices 452 (the light modulation devices for the red, green, and blue color lights are 452R, 452G, 452B, respectively) are formed as liquid crystal light valves each including a transmissive liquid crystal panel 454 having different light incident surface and light exiting surface and a light incident-side polarizer 453 and a light exiting-side polarizer 455 located on the light incident side and the light exiting side of the liquid crystal panel 454.

The light combining device 456 combines the color lights passing through the respective light modulation devices 452 and forms the image. In the embodiment, the light combining device 456 includes a cross dichroic prism in a nearly rectangular parallelepiped shape (nearly quadrangular prism shape).

The light combining device 456 has three light incident surfaces 456B, 456G, 456R (see FIG. 5 etc.) facing the respective light modulation devices 452, into which the color lights passing through the respective light modulation devices 452 are respectively entered, and a single light exiting surface 456E (see FIG. 5 etc.) that outputs the light formed by combination of the color lights (i.e. image light). The image light output from the light exiting surface 456E is entered into the projection optical device 46.

In the light combining device 456, holding members HM (see FIG. 2) that hold the corresponding light modulation devices 452 are respectively attached to the respective light incident surfaces 456B, 456G, 456R, and thereby, the light combining device 456 and the respective light modulation devices 452 are integrated.

As below, the configuration in which the light modulation devices 452 and the light combining device 456 are integrated is called the image formation unit FU. The image formation unit FU is supported by the posture adjustment device 5 to be described later.

The projection optical device 46 enlarges and projects the image light entering from the light combining device 456 on the projected surface to display the image formed by the image light on the projected surface. The projection optical device 46 is formed as a set lens including a plurality of lenses placed within a lens tube.

Note that the projection optical device 46 is supported to be movable in two directions (±X directions and ±Y directions, which will be described later) respectively orthogonal to the optical axis (center axis) of the projection optical device 46 and orthogonal to each other by a shift device (not shown). The shift device replaceably (detachably) holds the projection optical device 46 and is attached to a supporting member 8 of the posture adjustment device 5 to be described later. The projection optical device 46 may be replaceably attached to the supporting member 8 not via the shift device. However, the projection optical device 46 and the shift device may be undetachably attached to the supporting member 8.

The optical component casing 47 holds the above described devices 42 to 44 and the field lenses 451.

Here, in the image projection device 4, an illumination light axis Ax as an optical axis in design is set, and the optical component casing 47 holds the devices 42 to 44 and the field lenses 451 in predetermined positions on the illumination light axis Ax. In the optical component casing 47, a space S in which the image formation unit FU is placed is formed in a position surrounded on three sides by the respective field lenses 451.

Further, the light source 41 and the projection optical device 46 are placed in predetermined positions on the illumination light axis Ax.

Configuration of Posture Adjustment Device

Figure 2:
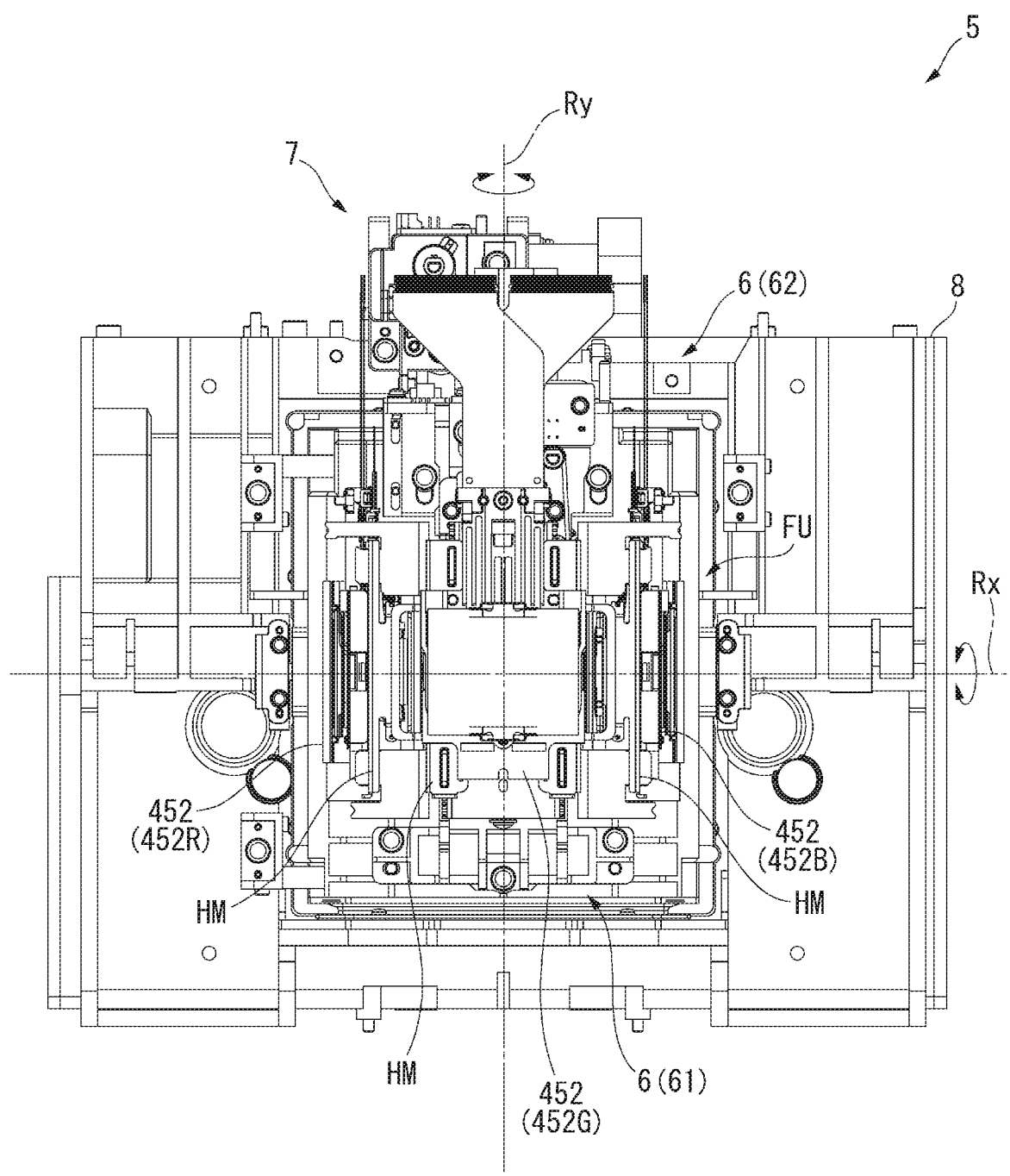
FIG. 2 shows a posture adjustment device in the embodiment as seen from a light incident side.
Figure 3:
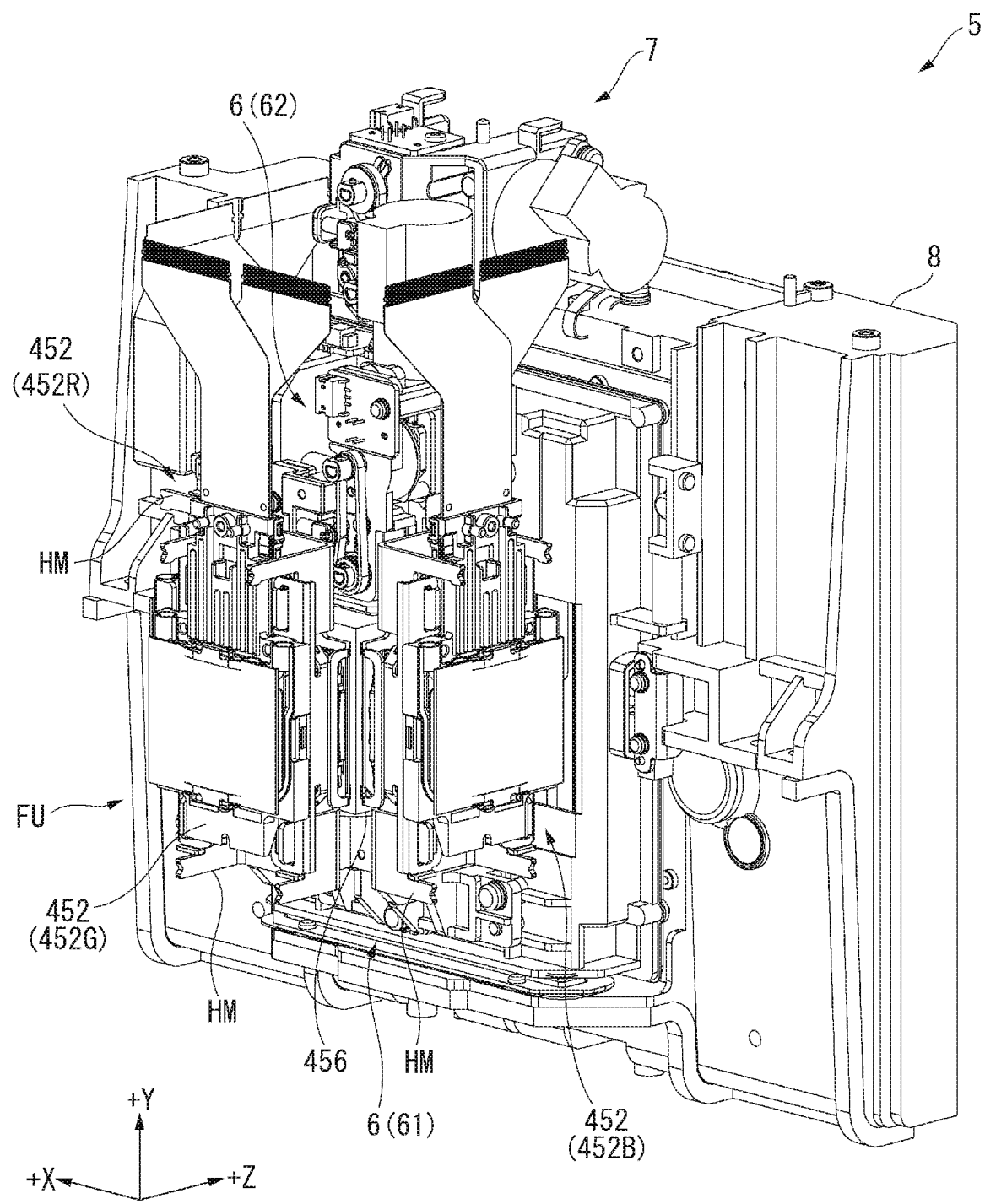
FIG. 3 is a perspective view showing the posture adjustment device in the embodiment as seen from the light incident side.
Figure 4:
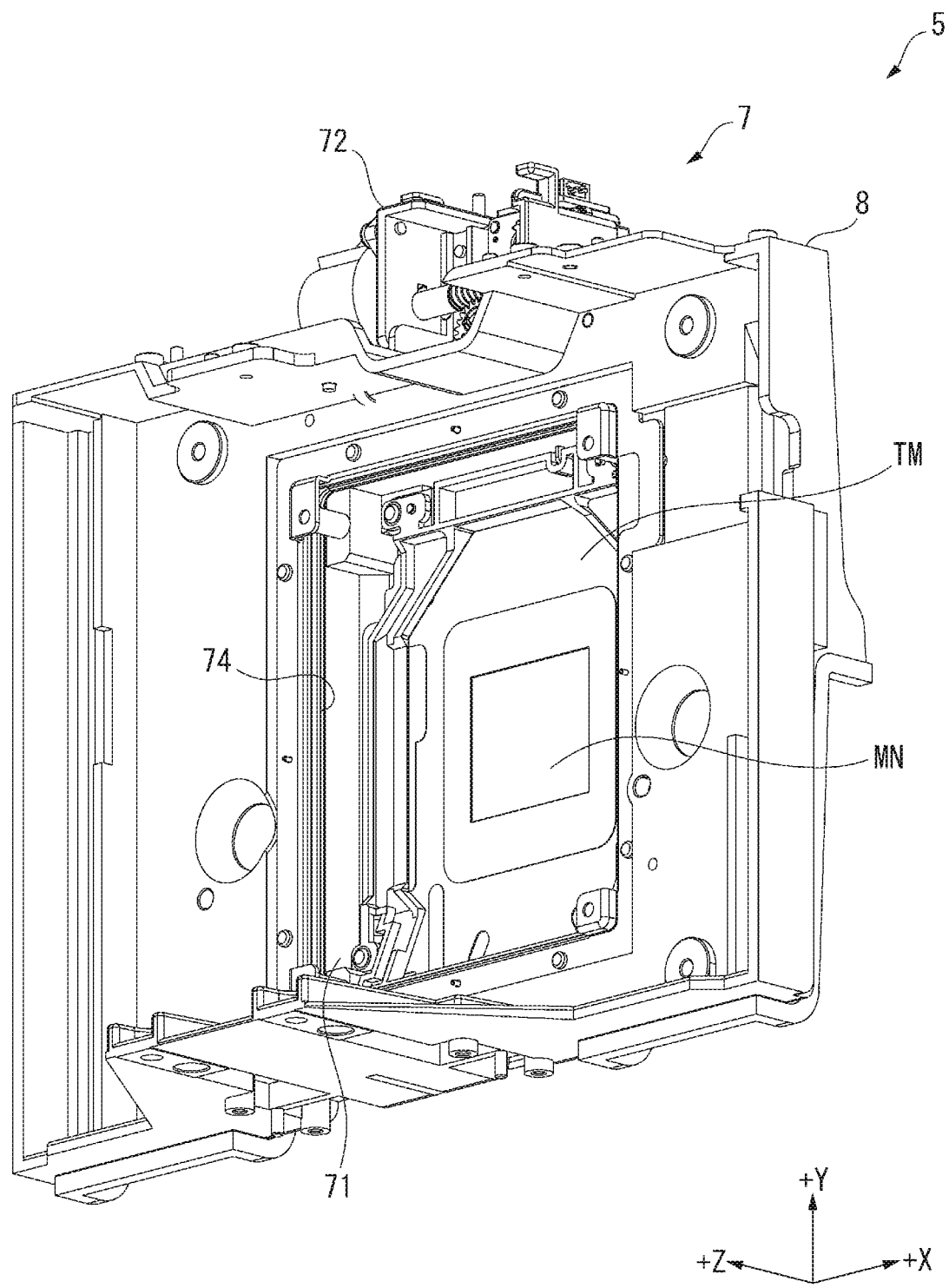
FIG. 4 is a perspective view showing the posture adjustment device in the embodiment as seen from a light exiting side.
Figure 5:
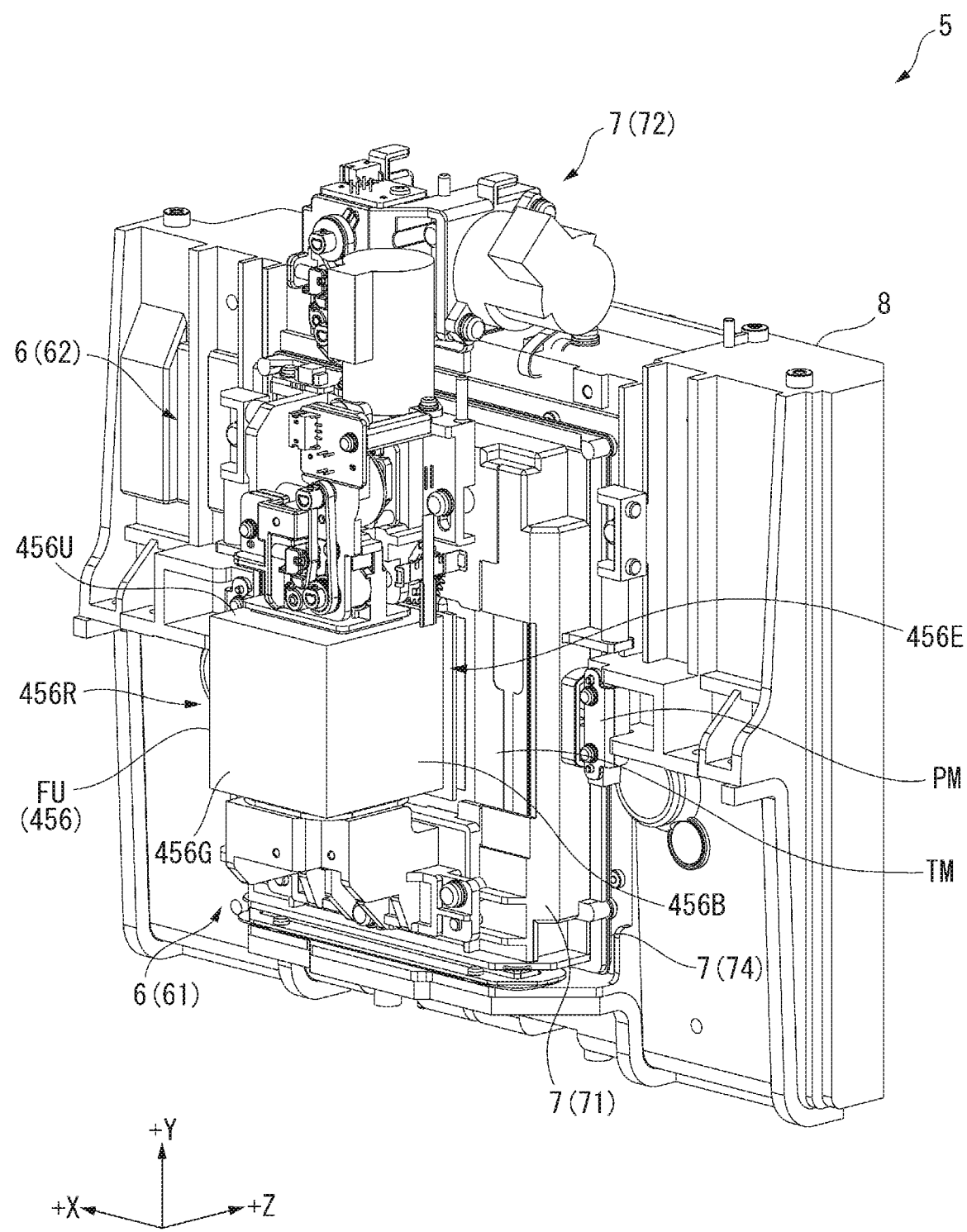
FIG. 5 is a perspective view showing the posture adjustment device in the embodiment as seen from the light incident side.

FIG. 2 shows the posture adjustment device 5 holding the image formation unit FU as seen from a light incident side with respect to the image formation unit FU. Further, FIGS. 3 and 4 are perspective views showing the posture adjustment device 5 as seen from the light incident side and a light exiting side with respect to the image formation unit FU, and FIG. 5 is a perspective view showing the posture adjustment device 5 holding the light combining device 456 as seen from the light incident side.

The image projection device 4 includes the posture adjustment device 5 shown in FIGS. 2 to 5 in addition to the above described configuration.

Note that, in the following explanation, an axis parallel to the optical axis of the projection optical device 46 is referred to as "Z-axis", and two axes orthogonal to the Z-axis and orthogonal to each other are referred to as "X-axis" and "Y-axis". A direction parallel to the Z-axis and from the rear surface part 24 toward the front surface part 23 is referred to as "+Z-direction". A direction parallel to the X-axis and from the left side surface part 25 toward the right side surface part 26 is referred to as "+X-direction", and a direction parallel to the Y-axis and from the bottom surface part toward the top surface part is referred to as "+Y-direction". That is, the +Z-direction is a direction in which the projection optical device 46 projects the image light as seen from the +Y-direction side. Further, the opposite direction to the +Z-direction is referred to as "−Z-direction" (not shown). The same applies to "−X-direction" and "−Y-direction".

The posture adjustment device 5 holds the light combining device 456 to hold the image formation unit FU and adjusts the tilt of the image formation unit FU relative to the optical axis of the projection optical device 46, and thus, adjusts the posture of the image formation unit FU. Specifically, the posture adjustment device 5 rotates the light combining device 456 around a rotation axis Rx and a rotation axis Ry orthogonal to the Z-axis and along the X-axis and the Y-axis orthogonal to each other, respectively, and thereby, adjusts the posture of the image formation unit FU.

The above described posture adjustment device 5 includes a first rotation part 6, a second rotation part 7, and the supporting member 8.

Configuration of First Rotation Part

Figure 6:
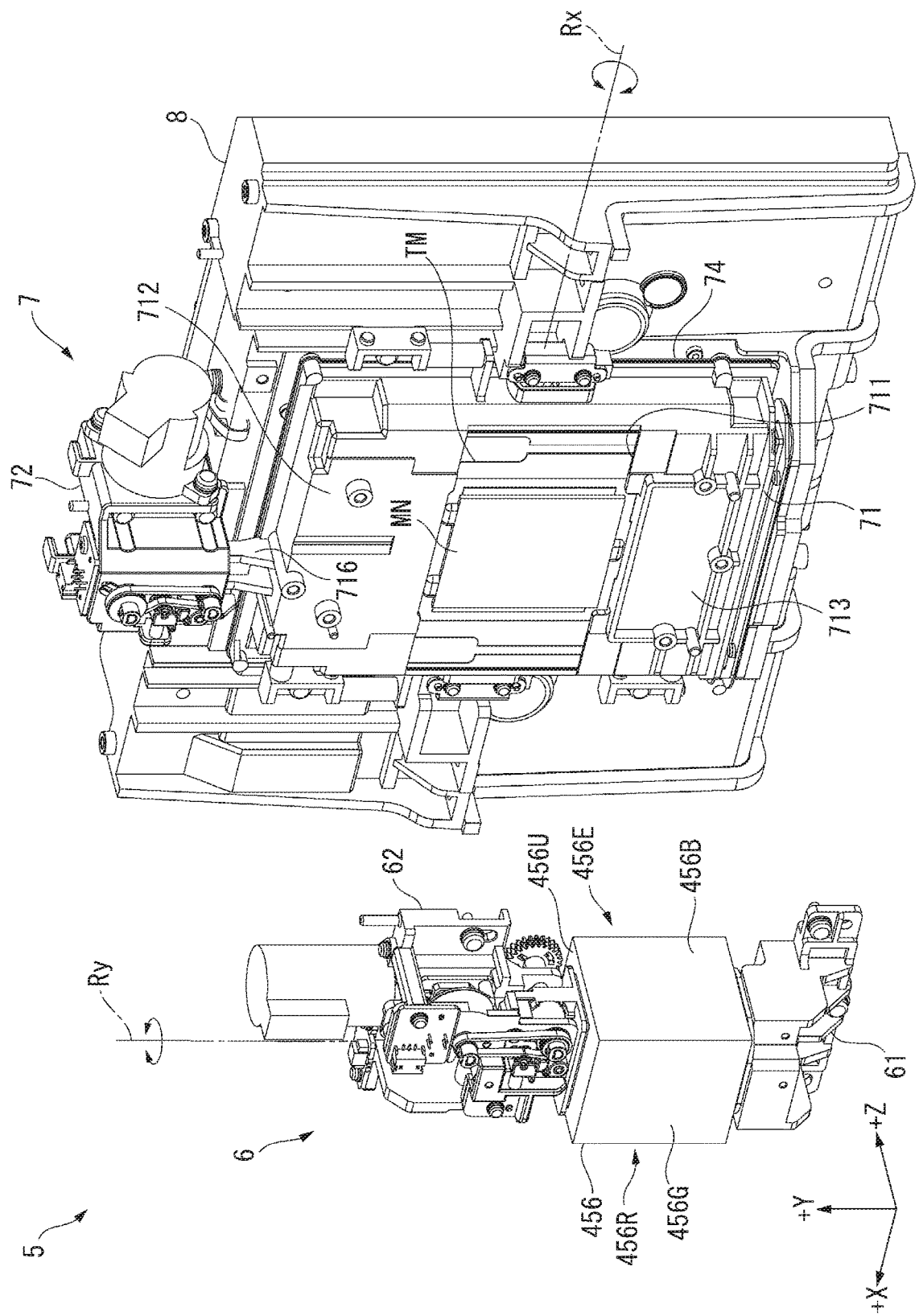
FIG. 6 is a perspective view showing the posture adjustment device in the embodiment.
Figure 7:
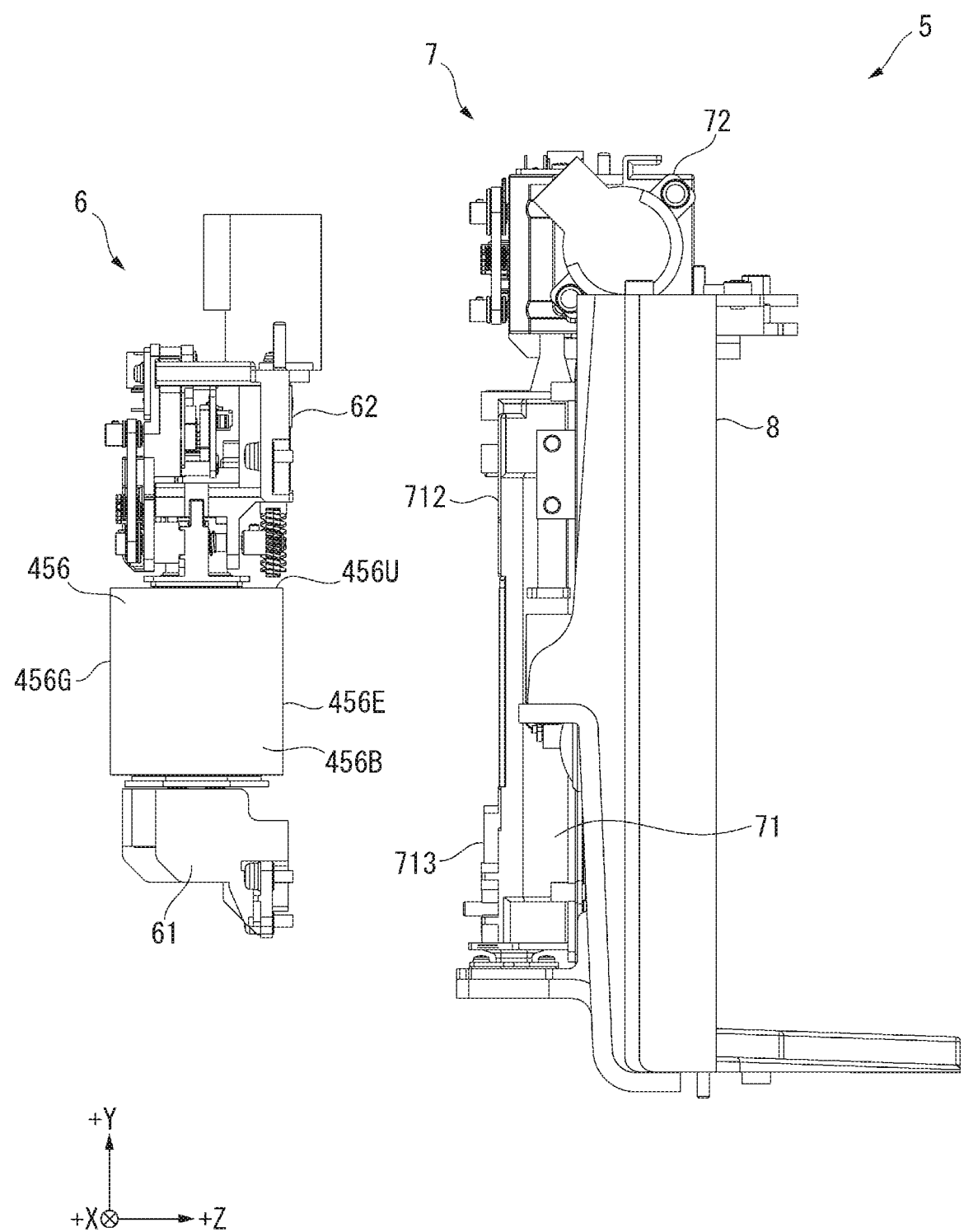
FIG. 7 is a side view showing the posture adjustment device in the embodiment.

FIG. 6 is a perspective view showing the posture adjustment device 5 from which the first rotation part 6 is separated as seen from the light incident side (−Z-direction side), and FIG. 7 is a side view showing the posture adjustment device 5 as seen from the −X-direction side.

The first rotation part 6 supports the light combining device 456 and rotates the light combining device 456 around the rotation axis Ry. The first rotation part 6 includes a rotation supporting unit 61 located on the −Y-direction side and a rotation drive unit 62 located on the +Y-direction side with respect to the light combining device 456, and the rotation supporting unit 61 and the rotation drive unit 62 are respectively attached to a frame 71 of the second rotation part 7.

Of the units, the rotation supporting unit 61 supports the light combining device 456 rotatably around the rotation axis Ry from the −Y-direction side.

Configuration of Rotation Drive Unit

Figure 8:
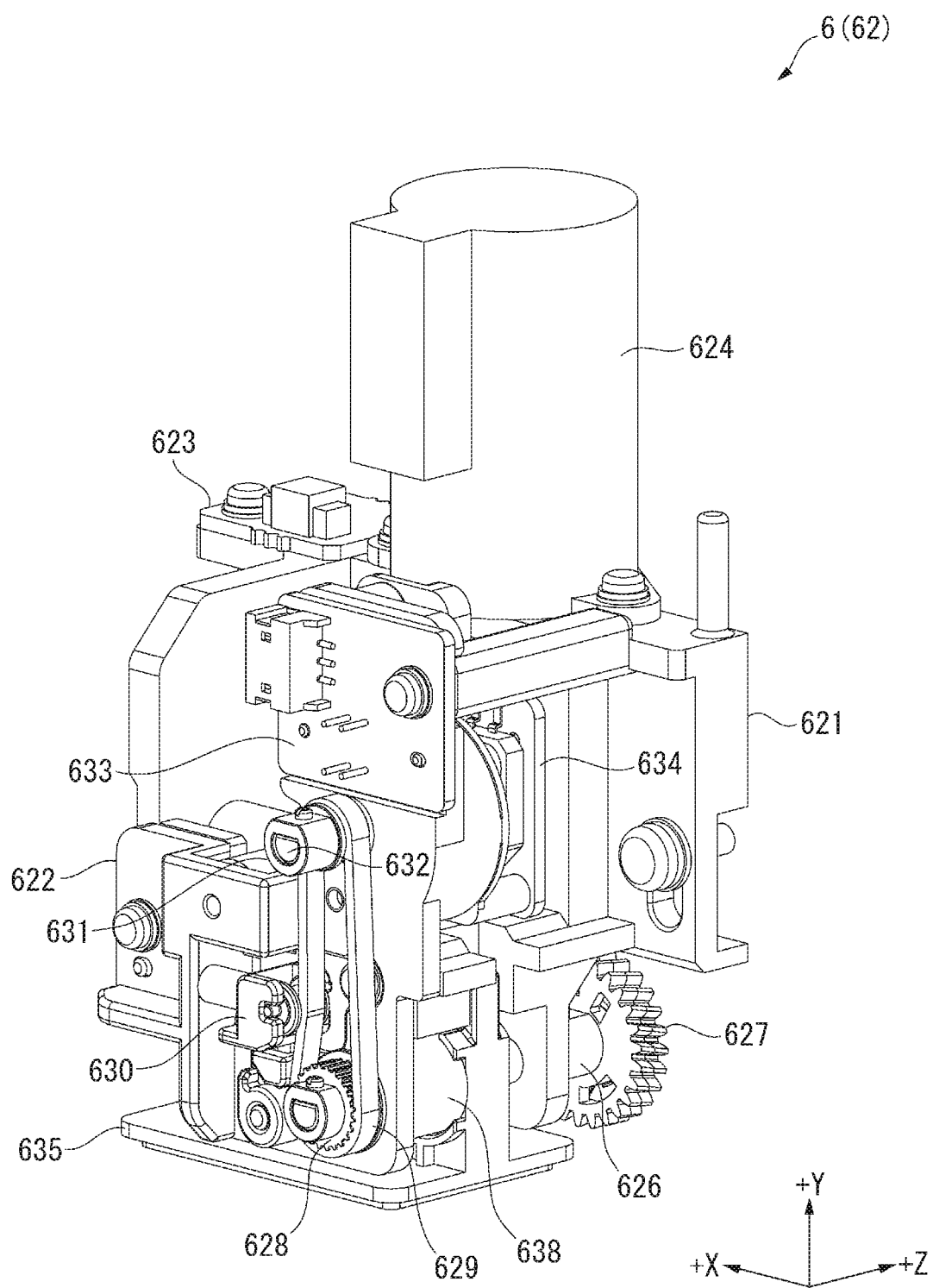
FIG. 8 is a perspective view showing a rotation drive unit in the embodiment as seen from the light incident side.
Figure 9:
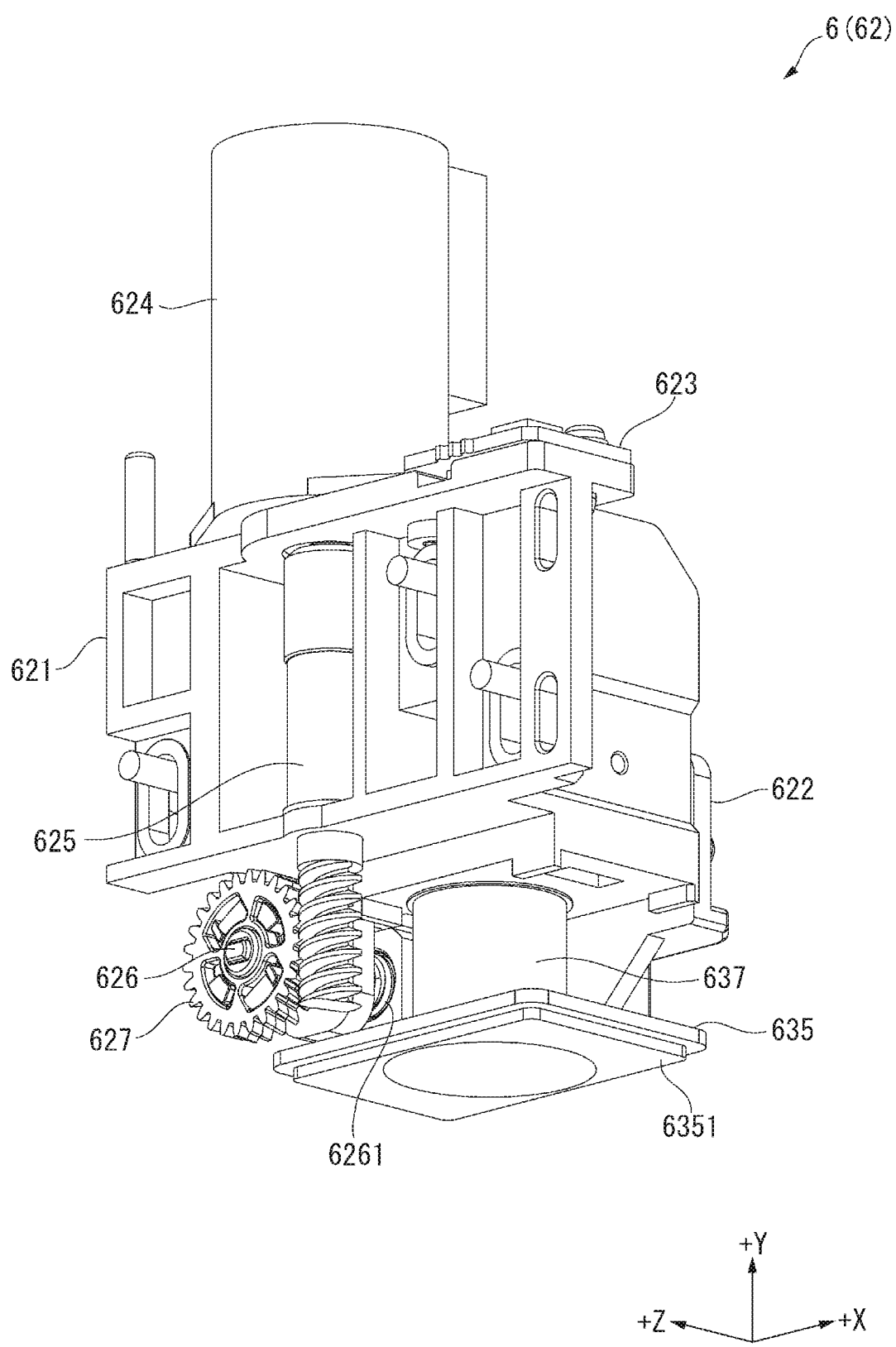
FIG. 9 is a perspective view showing the rotation drive unit in the embodiment as seen from the light exiting side.
Figure 10:
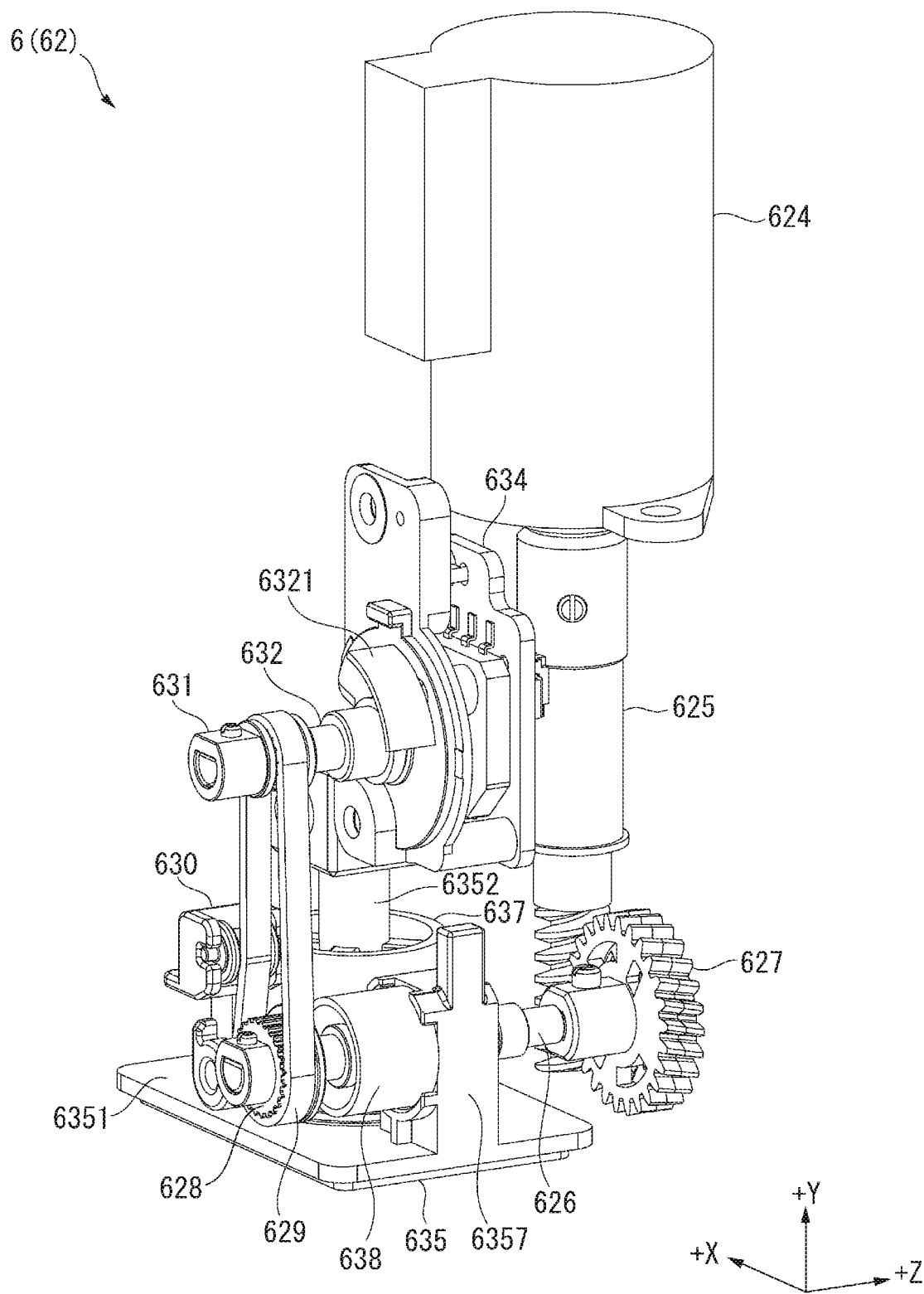
FIG. 10 is a perspective view showing the rotation drive unit in the embodiment as seen from the light incident side.
Figure 11:
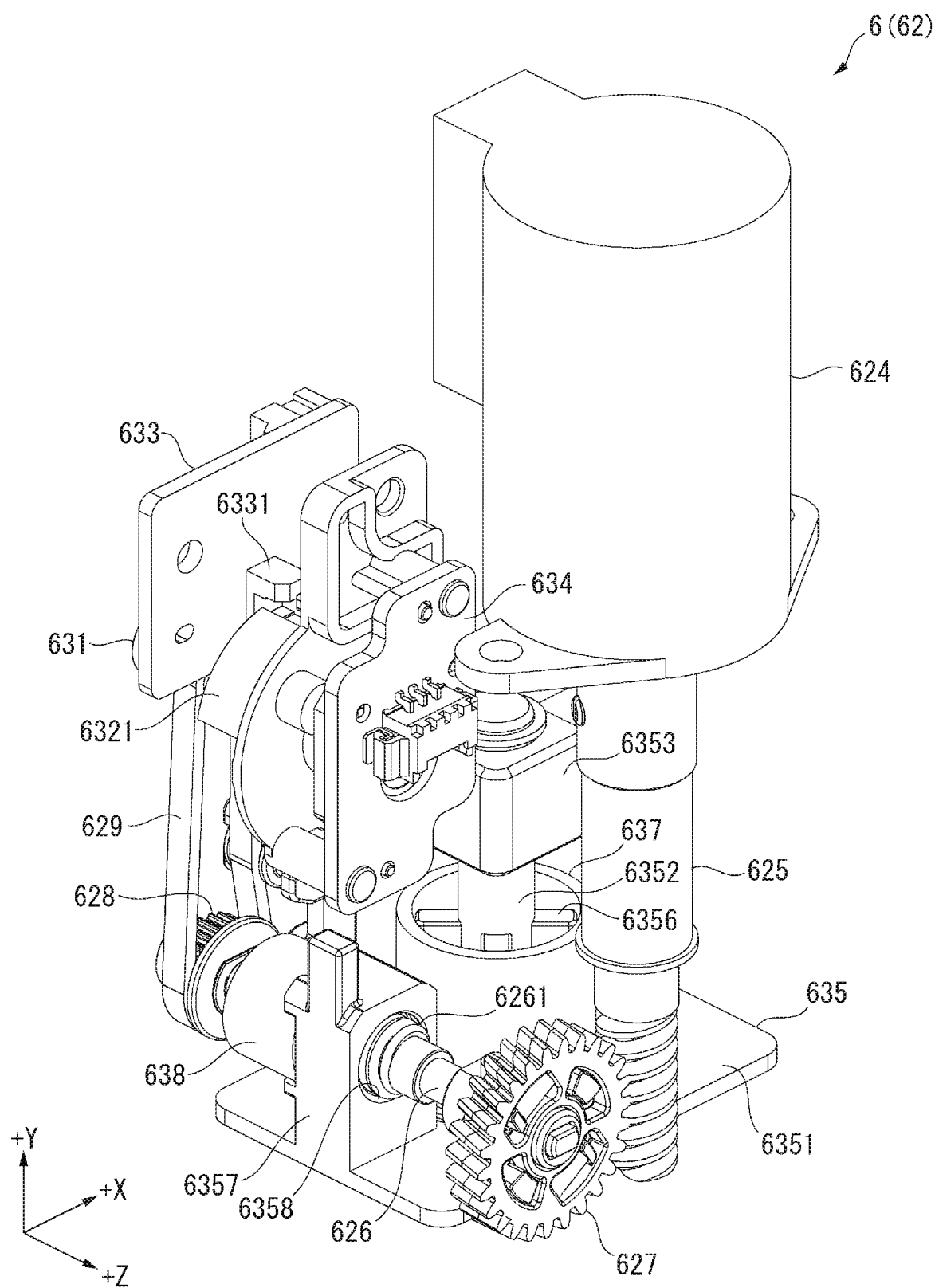
FIG. 11 is a perspective view showing the rotation drive unit in the embodiment as seen from the light exiting side.

FIGS. 8 and 9 are perspective views showing the rotation drive unit 62 as seen from the light incident side (−Z-direction side) and the light exiting side (+Z-direction side). Further, FIGS. 10 and 11 are perspective views showing the rotation drive unit 62 in which a first holding member 621, a second holding member 622, and a board 623 are not shown as seen from the light incident side and the light exiting side.

The rotation drive unit 62 rotates the light combining device 456 around the rotation axis Ry along the +Y-direction. As shown in FIGS. 8 to 11, the rotation drive unit 62 includes the first holding member 621 and the second holding member 622, the board 623 respectively attached to the holding members 621, 622, a motor 624, a worm gear 625, a lead screw 626, a worm wheel 627, a first pulley 628, a timing belt 629, a tensioner 630, a second pulley 631, a shaft member 632, a photosensor 633, and a potentiometer 634, a rotation member 635 fixed to the light combining device 456, and urging members 636 (636X, 636Y), 637, 638.

The first holding member 621 is fixed to the frame 71, which will be described later, by screws and holds the above described configurations 623 to 634 with the second holding member 622. As shown in FIGS. 8 and 9, the first holding member 621 holds the second holding member 622, the board 623, the motor 624, the end portion on the +Z-direction side in the lead screw 626, and the urging member 637. In addition, the first holding member 621 is in contact with the end portion on the +Y-direction side in the urging member 637 that urges the rotation member 635 toward the −Y-direction side.

The second holding member 622 is located on the −Z-direction side with respect to the first holding member 621 and combined with the first holding member 621. The second holding member 622 holds the end portion on the −Z-direction side in the lead screw 626, the tensioner 630, the photosensor 633, and the potentiometer 634.

The board 623 drives the motor 624 based on the control signal input from the above described control device 9.

The motor 624 is a driver that generates drive power for rotating the rotation member 635 fixed to the light combining device 456. As shown in FIGS. 9 to 11, the worm gear 625 is attached to the spindle (not shown) of the motor 624. Note that, in the embodiment, as the motor 624, a stepping motor that rotates the spindle in response to the input pulse signal is employed.

The worm gear 625 is placed so that the rotation axis may be along the +Y-direction and rotated by driving of the motor 624. The worm gear 625 meshes with the worm wheel 627. In addition to the worm gear 625, the lead screw 626, the worm wheel 627, and the rotation member 635 are driven by the motor 624 and forma rotation device that rotates the image formation unit FU around the rotation axis Ry.

The lead screw 626 is rotatably held so that the rotation axis may be along the +Z-direction to be immovable in the ±Z-directions by the first holding member 621 and the second holding member 622. The worm wheel 627 is fixed to the end portion on the +Z-direction side in the lead screw 626, and the first pulley 628 is fixed to the end portion on the −Z-direction side. As shown in FIG. 11, the lead screw 626 has a helical groove 6261 in the outer periphery nearly at the center in the +Z-direction, and the helical groove 6261 meshes with the rotation member 635. Note that, for the worm wheel 627, a no-backlash gear is employed for suppression of wobble between the worm gear 625 and itself.

The above described lead screw 626 is rotated with the worm wheel 627 meshing with the worm gear 625 when the worm gear 625 is rotated. Thereby, the rotation member 635 meshing with the helical groove 6261 is rotated around the rotation axis Ry.

Further, when the lead screw 626 is rotated, the first pulley 628 attached to the lead screw 626 is also rotated in the same direction.

The timing belt 629 is an annular belt connecting the first pulley 628 and the second pulley 631. By the timing belt 629, the rotation of the first pulley 628 is transmitted to the second pulley 631. That is, the timing belt is a transmission member that transmits the rotation of the first pulley 628 to the second pulley 631. Not that, in the embodiment, for the timing belt 629, a toothed belt (cogged belt) that meshes with the teeth (or grooves) formed in the respective circumferential surfaces of the first pulley 628 and the second pulley 631 is employed.

As shown in FIGS. 8 and 10, the tensioner 630 presses the timing belt 629 to suppress slack in the timing belt 629.

The second pulley 631 is fixed to the end portion on the −Z-direction side in the shaft member 632. Note that the second pulley 631 is a speed-up gear for the first pulley 628, and the rotation of the second pulley with the rotation of the first pulley 628 is increased. That is, when the rotation power of the first pulley 628 is transmitted by the timing belt 629, the second pulley 631 is rotated more than the first pulley 628.

The shaft member 632 is placed along the +Z-direction so that the center axis may be parallel to the lead screw 626, and rotated with the second pulley 631. As shown in FIGS. 8 and 11, the shaft member 632 is provided with a light shielding portion 6321 that shields a light receiving portion 6331 (FIG. 11) of the photosensor 633 attached to the second holding member 622.

Further, as shown in FIGS. 10 and 11, the shaft member 632 is connected to the potentiometer 634, and the potentiometer 634 detects the amount of rotation of the shaft member 632 and thus the rotation position of the rotation member 635. The photosensor 633 and the potentiometer 634 correspond to a rotation detection part.

Note that the end portion on the +Z-direction side in the shaft member 632 is formed in a spring shape that urges the opening portion (not shown) of the potentiometer 634 into which the end portion is inserted in a direction to increase the diameter. Thereby, wobble between the shaft member 632 and the inner surface of the opening portion is suppressed.

Figure 12:
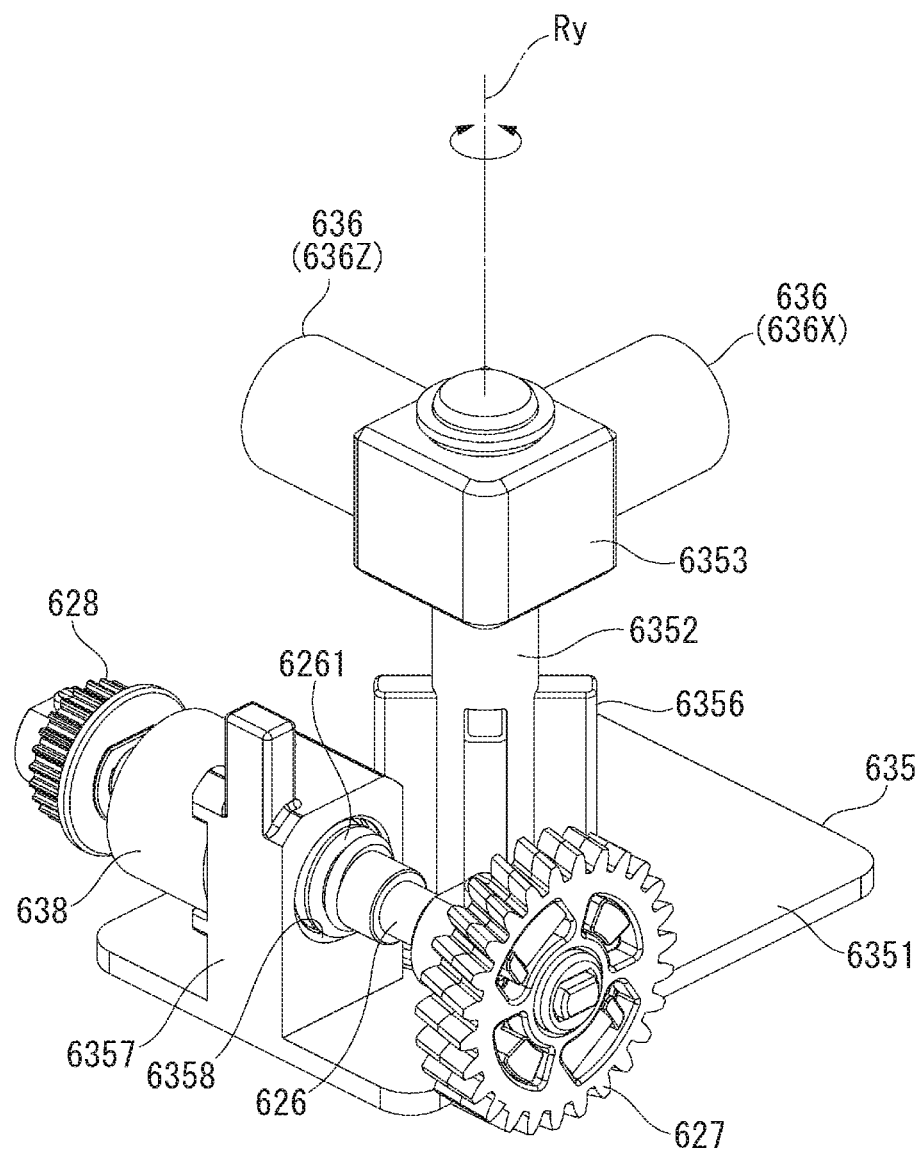
FIG. 12 is a perspective view showing a lead screw and a rotation member in the embodiment.

FIG. 12 is a perspective view showing the lead screw 626 and the rotation member 635 as seen from the light exiting side (−Z-direction side).

The rotation member 635 is bonded and fixed to a surface 456U on the +Y-direction side in the light combining device 456, and rotates the light combining device 456 and thus the image formation unit FU around the rotation axis Ry with the rotation of the lead screw 626. As shown in FIG. 12, the rotation member 635 has a plate-like portion 6351 along the XZ-plane, a shaft portion 6352, an urged member 6353, projecting portions 6356, and a meshing portion 6357.

The plate-like portion 6351 is formed in a nearly square plate shape as seen from the +Y-direction side and the surface on the −Y-direction side is bonded and fixed to the surface 456U.

The shaft portion 6352 projects in a cylindrical shape from nearly the center of the plate-like portion 6351 in the +Y-direction. The shaft portion 6352 serves as the rotation axis Ry of the light combining device 456 (image formation unit FU). Further, the position in which the shaft portion 6352 is formed is a position according to the center of the light combining device 456 as seen from the −Y-direction side. The urged member 6353 in a nearly rectangular parallelepiped shape is fixed to the end of the shaft portion 6352.

The urged member 6353 is urged toward the −X-direction and the +Z-direction so that the shaft portion 6352 may come into contact with the inner surface of the opening portion (not shown) in a nearly rectangular shape of the first holding member 621 through which the shaft portion 6352 is inserted by the urging members 636 (636X, 636Z).

A plurality of the projecting portions 6356 radially project from the circumferential surface on the −Y-direction side in the shaft portion 6352. These projecting portions 6356 are portions that position the urging member 637 (see FIGS. 8 to 11) having the end portion on the +Y-direction side in contact with the first holding member 621, and the urging member 637 as a coil spring is placed to surround the projecting portions 6356. The end portion on the −Y-direction side of the urging member 637 comes into contact with the surface on the +Y-direction side in the plate-like portion 6351, and thereby, the urging member 637 urges the rotation member 635 and thus the light combining device 456 (image formation unit FU) toward the −Y-direction side (the above described rotation supporting unit 61 side).

The meshing portion 6357 is a portion that meshes with the helical groove 6261 of the lead screw 626, and formed in a rectangular tubular shape surrounding the lead screw 626 in the circumferential direction. That is, the meshing portion 6357 has an opening portion 6358 into which the lead screw 626 is inserted along the +Z-direction and teeth (not shown) that mesh with the helical groove 6261.

The meshing portion 6357 and the helical groove 6261 mesh each other, and thereby, when the lead screw 626 is rotated around the rotation axis along the +Z-direction, the rotation member 635 is rotated around the shaft portion 6352 and thus the light combining device 456 (image formation unit FU) is rotated around the rotation axis Ry.

Note that the meshing portion 6357 is urged toward the +Z-direction side by the urging member 638 having one end in contact with the first holding member 621 (specifically, a holding portion that holds the end portion on the −Z-direction side of the lead screw 626 in the first holding member 621) and the other end in contact with the meshing portion 6357. Thereby, the meshing portion 6357 and the helical groove 6261 are constantly maintained in contact. The urging member 638 is formed by a coil spring placed coaxially with the lead screw 626 in the embodiment.

Configuration of Second Rotation Part

Figure 13:
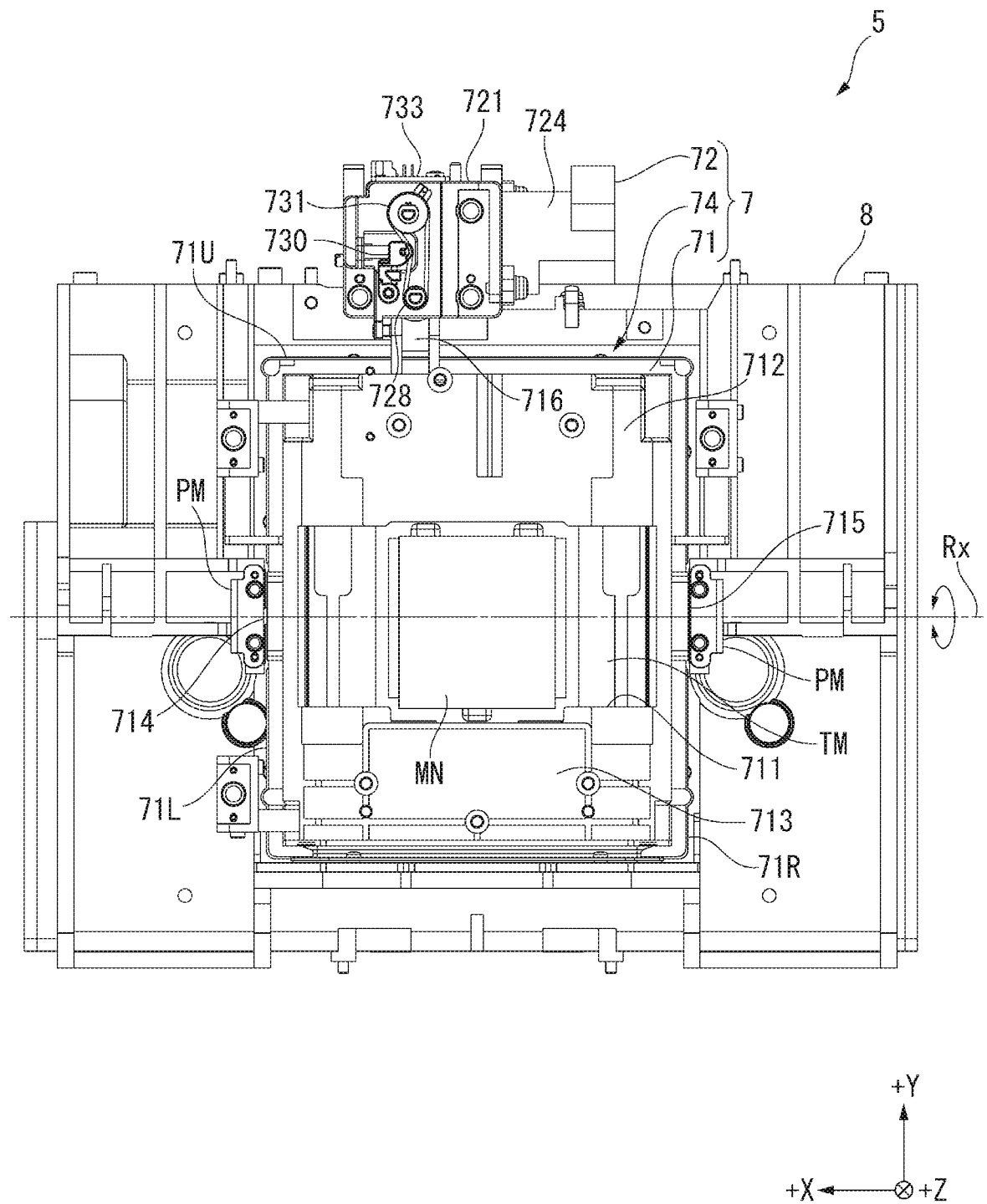
FIG. 13 shows the posture adjustment device in the embodiment as seen from the light incident side.
Figure 14:
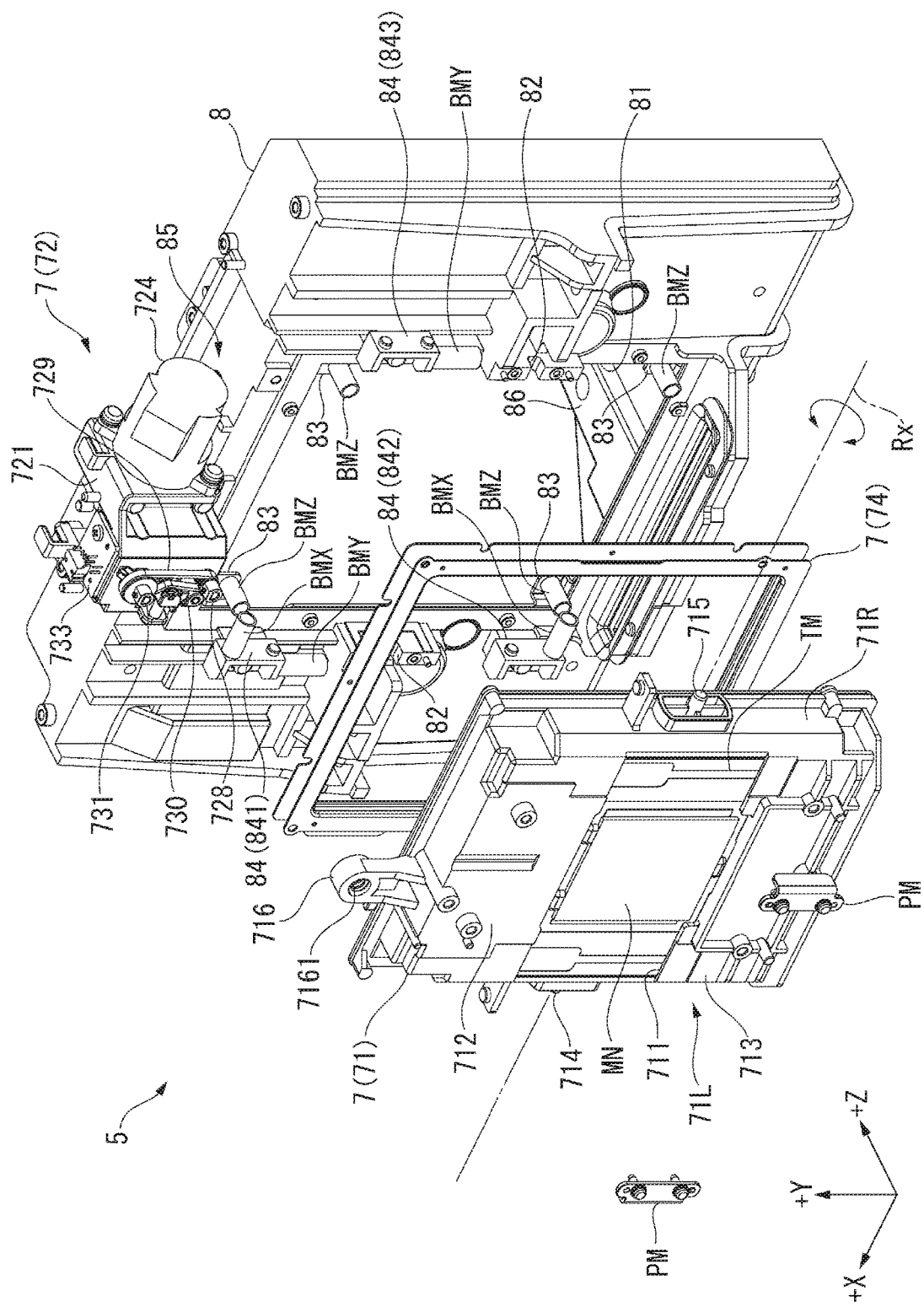
FIG. 14 is an exploded perspective view showing the posture adjustment device in the embodiment as seen from the light incident side.

FIG. 13 shows the posture adjustment device 5 from which the first rotation part 6 and the light combining device 456 are detached as seen from the light incident side (−Z-direction side), and FIG. 14 is a perspective view showing the posture adjustment device 5 as seen from the light incident side.

The second rotation part 7 supports the first rotation part 6 and is supported by the supporting member 8 and rotates the whole first rotation part 6 and thus the image formation unit FU around the rotation axis Rx along the +X-direction, and corresponds to an X rotation part. As shown in FIGS. 13 and 14, the second rotation part 7 includes the frame 71, a rotation mechanism 72 that rotates the frame 71, and a sealing member 74 in a rectangular frame shape placed between the frame 71 and the supporting member 8.

The sealing member 74 seals the gap between the frame 71 and the supporting member 8 to suppress entry of a gas containing dust etc. from the space on the +Z-direction side into the space on the −Z-direction side (the space on the side on which the image formation unit FU is placed) with respect to the supporting member 8 via the gap.

Configuration of Frame

The frame 71 supports the first rotation part 6 and is formed in a nearly rectangular shape elongated in the +Y-direction as seen from the −Z-direction side. A concave portion (not shown) opening toward the +Z-direction side is formed in the frame 71, and a holding member TM holding an optical component MN such as a retardation film is placed within the concave portion.

The frame 71 has an opening portion 711, attachment portions 712, 713, shaft portions 714, 715, and an engagement portion 716.

The opening portion 711 is an opening portion through which the image light output from the light combining device 456 passes along the +Z-direction. The opening portion 711 is formed in a rectangular shape nearly at the center of the frame 71.

The attachment portions 712, 713 are provided in positions with the opening portion 711 in between in the +Y-direction. Of the portions, the first holding member 621 of the rotation drive unit 62 is attached to the attachment portion 712 located on the +Y-direction side, and the rotation supporting unit 61 is attached to the attachment portion 713 located on the −Y-direction side.

The shaft portions 714, 715 are portions that form the rotation axis Rx of the frame 71. Of the portions, the shaft portion 714 is projected in a cylindrical shape from a side surface 71L on the +X-direction side in the frame 71, and the shaft portion 715 is projected in a cylindrical shape from a side surface 71R on the −X-direction side. These shaft portions 714, 715 are inserted from the −Z-direction side into groove portions 82 (FIG. 14) along the +X-direction formed in the supporting member 8 and a pressing member PM is attached to the supporting member 8 to cover the shaft portions 714, 715 from the −Z-direction side, and thereby, the frame 71 is supported rotatably around the shaft portions 714, 715 by the supporting member 8.

Here, the positions in which the shaft portions 714, 715 are formed in the frame 71 are set to positions in which the center axes of the shaft portions 714, 715 connect the centers of the image formation areas (modulation areas) of the respective liquid crystal panels 454 of the light modulation devices 452B, 452R forming the image formation unit FU as seen along the +Z-direction when the frame 71 is not rotated.

The engagement portion 716 projects from a side surface 71U on the +Y-direction side in the frame 71 toward the +Y-direction side and engages with the rotation mechanism 72. Specifically, the engagement portion 716 has a female screw hole 7161 penetrating the engagement portion 716 in the +Z-direction and a lead screw 726 forming the rotation mechanism 72 is inserted into the female screw hole 7161. The lead screw 726 is rotated and the engagement portion 716 is moved in the +Z-direction, and thereby, the frame 71 is rotated around the shaft portions 714, 715.

Configuration of Rotation Mechanism

Figure 15:
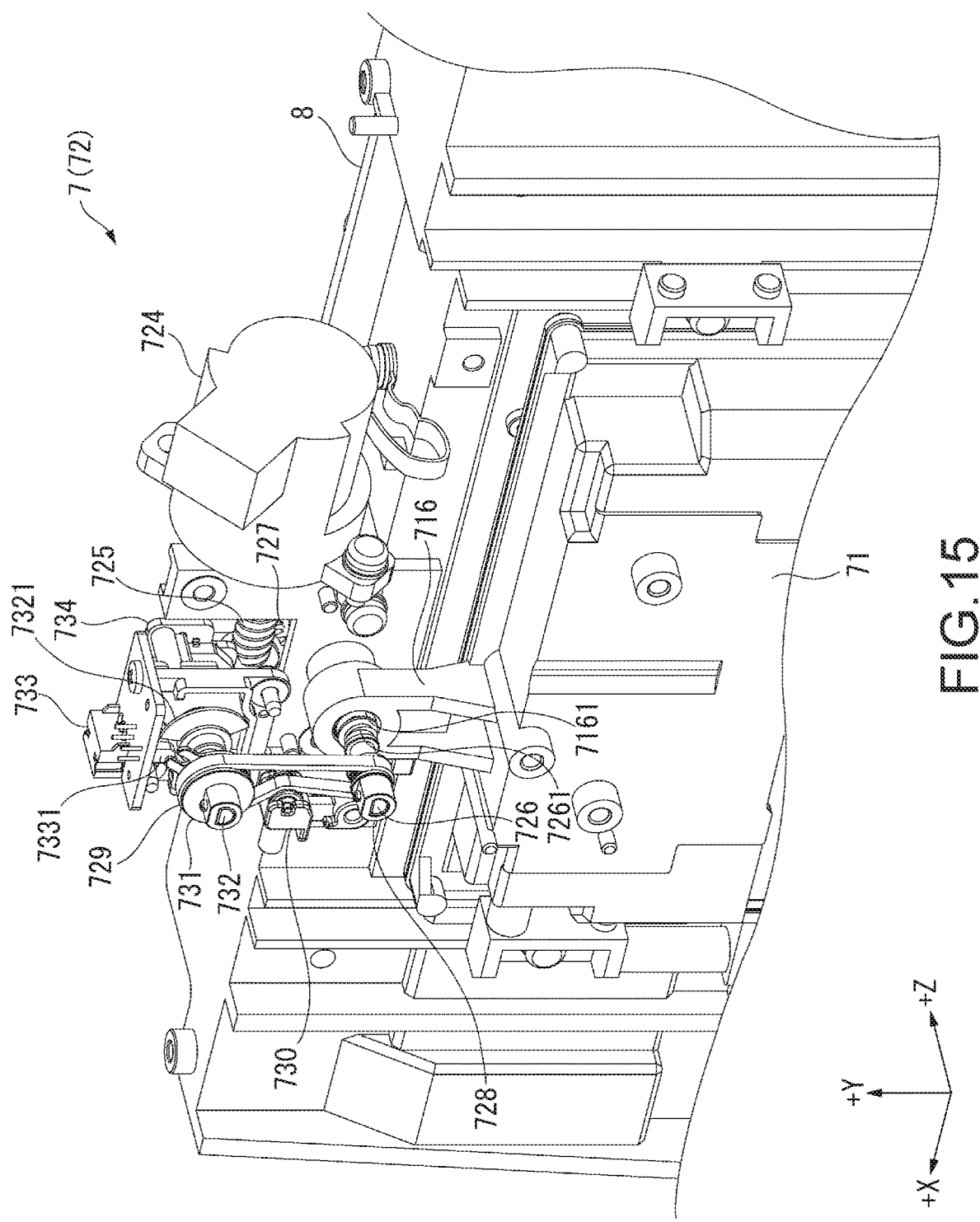
FIG. 15 is an enlarged perspective view showing a rotation mechanism in the embodiment.
Figure 16:
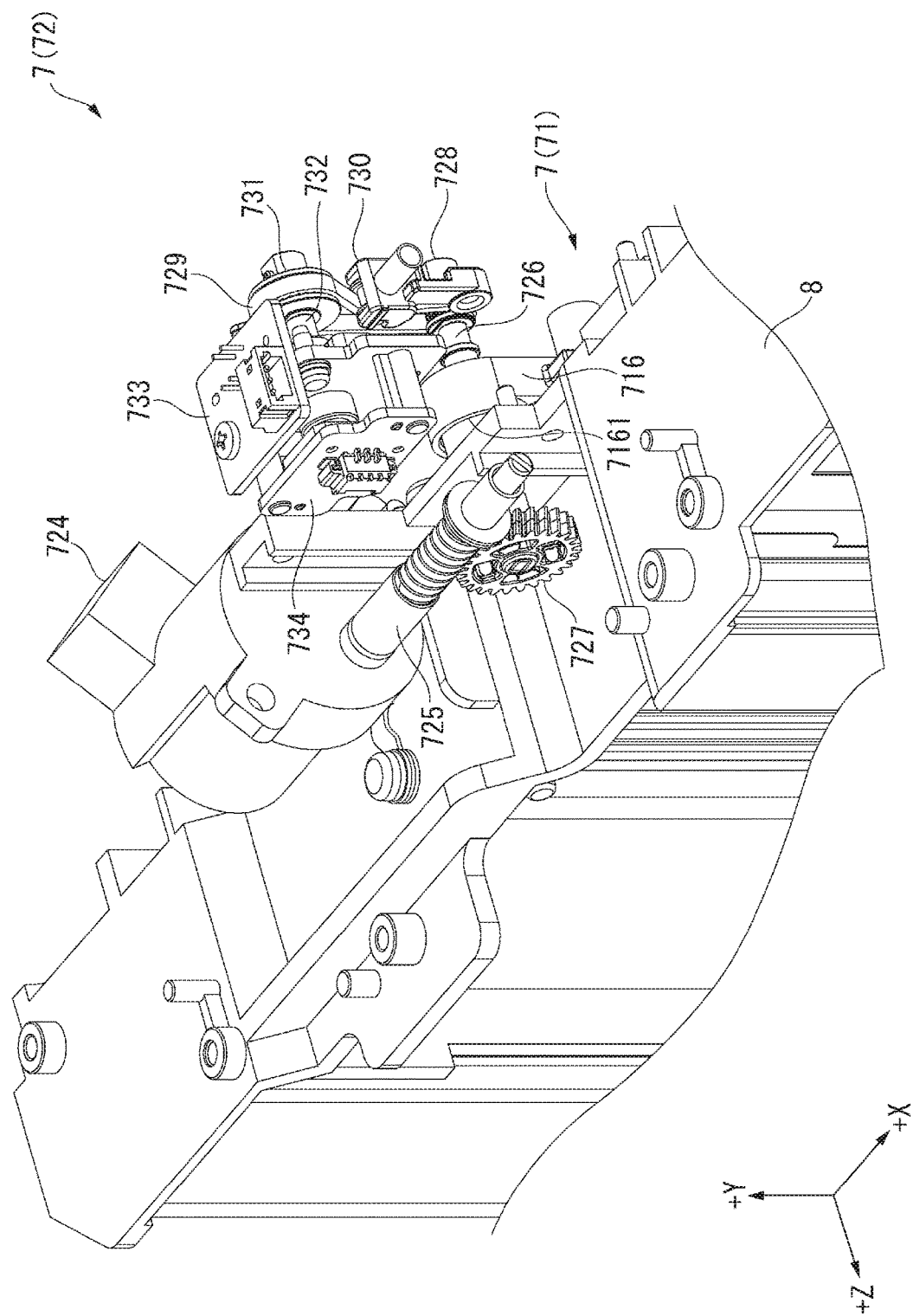
FIG. 16 is an enlarged perspective view showing the rotation mechanism in the embodiment.

FIGS. 15 and 16 are enlarged perspective views showing the rotation mechanism 72. Specifically, FIG. 15 is the perspective view of the rotation mechanism 72 as seen from the light incident side (−Z-direction side) and FIG. 16 is the perspective view as seen from the light exiting side (+Z-direction side). Note that, in FIGS. 15 and 16, the holding member 712 forming the rotation mechanism 72 is omitted.

The rotation mechanism 72 has the same configuration as the above described rotation drive unit 62 and moves the engagement portion 716 in the ±Z-directions and rotates the frame 71 around the rotation axis Rx, and thereby, rotates the image formation unit FU around the rotation axis Rx. The rotation mechanism 72 has a motor 724, a worm gear 725, the lead screw 726, a worm wheel 727, a first pulley 728, a timing belt 729, a tensioner 730, a second pulley 731, a shaft member 732, a photosensor 733, and a potentiometer 734 as shown in FIGS. 15 and 16 in addition to the holding member 721 as shown in FIGS. 13 and 14.

The holding member 721 holds the above described configurations 724 to 734 and is attached to the supporting member 8.

The motor 724 is a stepping motor driven according to input pulse signals and a driver that generates drive power for rotating the frame 71. The motor 724 is placed with the spindle (not shown) along the +X-direction.

The worm gear 725 is attached to the spindle of the motor 724. Note that, like the above described configuration, the worm gear 725, the lead screw 726, the worm wheel 727, and the frame 71 form a rotation device that rotates the image formation unit FU.

The lead screw 726 is a shaft-like member placed along the +Z-direction and supported by the above described holding member 721 immovably in the ±Z-directions, but rotatably around the rotation axis along the +Z-direction. The worm wheel 727 is fixed to the end portion on the +Z-direction side in the lead screw 726, and the first pulley 728 is fixed to the end portion on the −Z-direction side. Further, a helical groove 7261 that meshes with the female screw hole 7161 of the engagement portion 716 is formed at the center in the +Z-direction of the lead screw 726.

When the motor 724 is driven to rotate the worm gear 725, the lead screw 726 is rotated integrally with the worm wheel 727 meshing with the worm gear 725. Thereby, the frame 71 (engagement portion 716) engaging with the lead screw 726 is moved in the ±Z-directions, and the frame 71 is rotated as described above.

The timing belt 729 is a toothed belt that connects the first pulley 728 and the second pulley 731 and transmits the rotation of the first pulley 728 to the second pulley 731.

The tensioner 730 presses the timing belt 729 to suppress slack in the timing belt 729.

The second pulley 731 is a speed-up gear for the first pulley 728 like the above described second pulley 631 and, when the rotation of the first pulley 728 is transmitted by the timing belt 729, rotated more than the first pulley 728.

The shaft member 732 is placed along the +Z-direction so that the center axis may be parallel to the lead screw 726. The shaft member 732 is provided with a light shielding portion 7321 that shields a light receiving portion 7331 (FIG. 15) of the photosensor 733 placed on the +Y-direction side with respect to the shaft member 732.

Further, the shaft member 732 is connected to the potentiometer 734, and the potentiometer 734 detects the amount of rotation of the shaft member 732 and thus the rotation position of the frame 71.

In the rotation mechanism 72, when the worm gear 725 attached to the motor 724 is rotated around the rotation axis along the +X-direction, the lead screw 726 is rotated with the worm wheel 727 meshing with the worm gear 725. The helical groove 7261 of the lead screw 726 meshes with the female screw hole 7161 of the engagement portion 716 and the engagement portion 716 is moved in the ±Z-directions and, thereby, the frame 71 is rotated around the shaft portions 714, 715 (rotation axis Rx).

The rotation of the lead screw 726 is transmitted to the shaft member 732 provided with the second pulley 731 via the first pulley 728 and the timing belt 729. The rotation of the shaft member 732 is detected by the potentiometer 734.

Furthermore, the detection result of the photosensor 733 by the light shielding portion 7321 provided in the shaft member 732 is used for origin return of the frame 71.

Configuration of Supporting Member

The supporting member 8 supports the second rotation part 7 and thus the first rotation part 6 and the image formation unit FU, and is formed in a nearly rectangular shape elongated in the +X-direction as seen from the −Z-direction side as shown in FIG. 14. The supporting member 8 has an opening portion 81, the groove portions 82, attachment portions 83, 84, 85, and a fixing portion 86.

The opening portion 81 is formed in a rectangular shape elongated in the +Y-direction at the center of the supporting member 8 to penetrate the supporting member 8 in the +Z-direction. The opening portion 81 is an opening portion through which the image light output from the image formation unit FU passes, and the image light is entered into the projection optical device 46 attached to the supporting member 8.

The groove portions 82 are formed along the +X-direction in respective positions on the +X-direction side and the −X-direction side with respect to the opening portion 81. The above described shaft portions 714, 715 are inserted into the groove portions 82 from the −Z-direction side. The pressing member PM is attached to the supporting member 8 to cover the shaft portions 714, 715 from the −Z-direction side, and thereby, the frame 71 is rotatably supported by the supporting member 8.

The attachment portions 83 are respectively provided in four corners of the opening portion 81 formed in the rectangular shape. Urging members BMZ that urge the frame 71 toward the −Z-direction side are respectively attached to these attachment portions 83.

Two of the attachment portions 84 are provided in positions on the +X-direction side with respect to the opening portion 81 with the groove portions 82 in between in the +Y-direction, and further, one of the attachment portions is provided in a position on the −X-direction side with respect to the opening portion 81 and on the +Y-direction side with respect to the groove portions 82. Of the portions, to the attachment portion 841 located on the +X-direction side and on the +Y-direction side, an urging member BMX that urges the frame 71 toward the −X-direction side and an urging member BMY that urges the frame 71 toward the −Y-direction side are attached. Further, to the attachment portion 842 located on the +X-direction side and on the −Y-direction side, an urging member BMX that urges the frame 71 toward the −X-direction side is attached. Furthermore, to the attachment portion 843 located on the −X-direction side, an urging member BMY that urges the frame 71 toward the −Y-direction side is attached. By these urging members BMX, BMY, BMZ, wobble of the frame 71 with the shaft portions 714, 715 placed within the groove portions 82 is suppressed.

The attachment portion 85 is located on the side surface on the +Y-direction side in the supporting member 8. The above described rotation mechanism 72 (holding member 721) is attached to the attachment portion 85.

The fixing portion 86 extends from the end portion on the −Y-direction side toward the +Z-direction side in the supporting member 8. The fixing portion 86 is a portion for fixing the supporting member 8 to a base member (not shown) provided within the exterior housing 2 along the above described bottom surface part.

Configuration of Control Device

Figure 17:
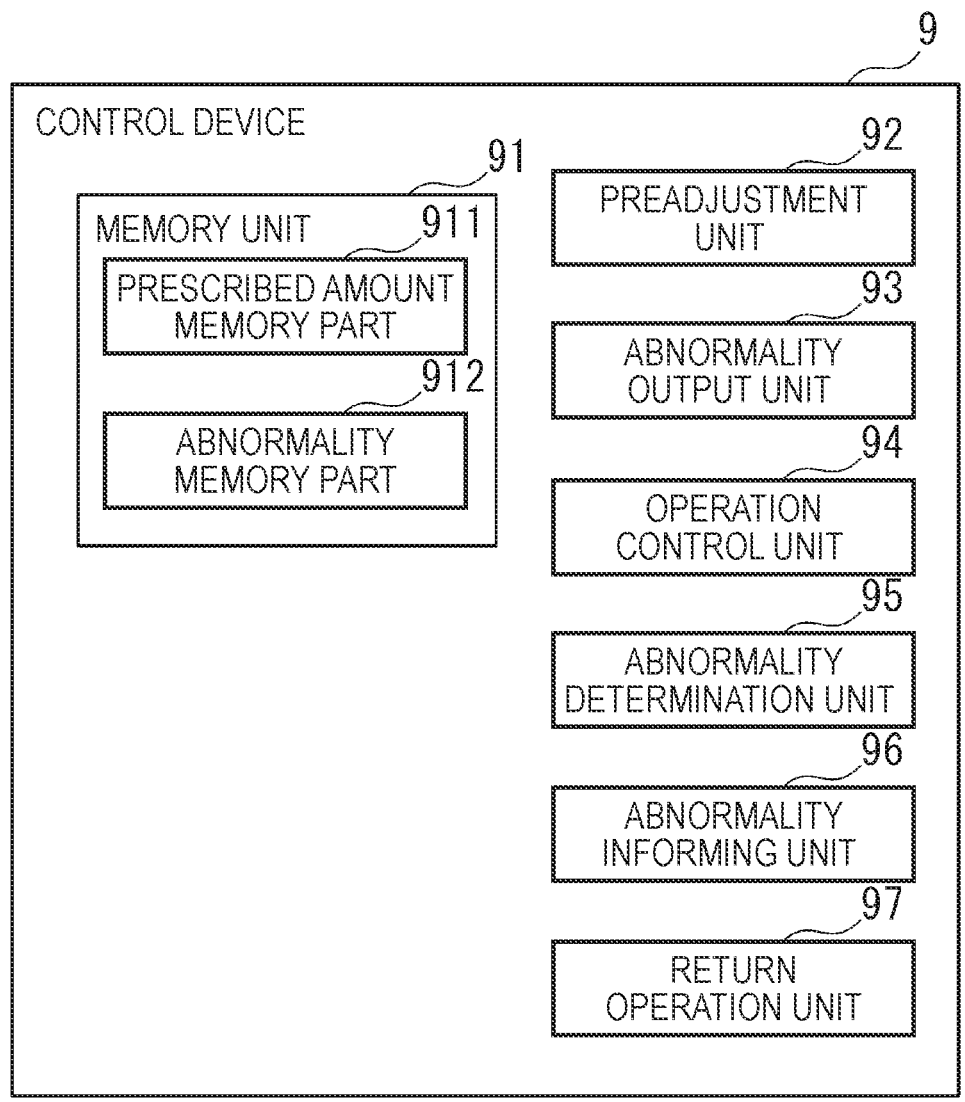
FIG. 17 is a block diagram showing a configuration of a control device in the embodiment.

FIG. 17 is a block diagram showing a configuration of the control device 9.

The control device 9 includes an arithmetic circuit such as a CPU (Central Processing Unit) and a memory circuit such as a flash memory, and controls the operation of the projector 1. For example, the control device 9 controls lighting of the light source 41, and processes input image information and outputs image signals according to the image information to the above described light modulation devices 452 (liquid crystal panels 454). Further, the control device 9 according to the embodiment controls the operation of the posture adjustment device 5.

As shown in FIG. 17, the above described control device 9 has a memory unit 91, a preadjustment unit 92, an abnormality output unit 93, an operation control unit 94, an abnormality determination unit 95, an abnormality informing unit 96, and a return operation unit 97.

The memory unit 91 stores various kinds of programs and data necessary for the operation of the projector 1. For example, the memory unit 91 stores correction values used for correction of input image information and additionally stores lighting times of the light source 41 etc. Further, the memory unit 91 has a prescribed amount memory part 911 and an abnormality memory part 912.

The prescribed amount memory part 911 stores prescribed amounts used in origin return processing, which will be described later. The prescribed amounts are values stored in advance in a factory or the like before shipment of the projector 1 and respectively set for the first rotation part 6 and the second rotation part 7. Of the amounts, the first prescribed amount corresponding to the first rotation part 6 is an amount of rotation for moving the shaft member 632 and thus the light combining device 456 to the original position from a change position where a shielded state in which the light receiving portion 6331 (FIG. 11) of the photosensor 633 is shielded by the light shielding portion 6321 of the shaft member 632 and a non-shielded state in which the light receiving portion 6331 is not shielded are switched, and the amount of rotation is expressed by the number of steps (pulse number) of the motor 624. Further, the second prescribed amount corresponding to the second rotation part 7 is an amount of rotation for moving the shaft member 732 and thus the light combining device 456 to the original position from a change position where a shielded state in which the light receiving portion 7331 (FIG. 15) of the photosensor 733 is shielded by the light shielding portion 7321 of the shaft member 732 and a non-shielded state in which the light receiving portion 7331 is not shielded are switched, and the amount of rotation is expressed by the number of steps (pulse number) of the motor 724.

Note that the original position is a position at the center of a movement range (rotation range) around the above described rotation axis Ry and assumed in advance in the first rotation part 6, and is a position at the center of a movement range (rotation range) around the above described rotation axis Rx and assumed in advance in the second rotation part 7. Further, the original position is a position without posture adjustment by the posture adjustment device 5 and at factory shipment.

The abnormality memory part 912 stores, if the preadjustment unit 92 and the return operation unit 97, which will be described later, determine that an abnormality has occurred, details of the abnormality. Specifically, the abnormality memory part 912 stores an error code indicating the details of the abnormality. The abnormality memory part 912 can store a plurality of the error codes.

The preadjustment unit 92 functions before factory shipment, for example, and executes prescribed amount acquisition processing, which will be described later, and stores the acquired prescribed amounts (first prescribed amount and second prescribed amount) in the prescribed amount memory part 911.

The abnormality output unit 93 outputs the details of the abnormality occurred in the prescribed amount acquisition processing.

The operation control unit 94 operates the projector 1 according to an operation by a user. For example, the operation control unit 94 operates the posture adjustment device 5 according to an operation by the user.

The abnormality determination unit 95 determines whether or not an abnormality has occurred in the projector 1, particularly, in the posture adjustment device 5. For example, the abnormality determination unit 95 determines whether or not a failure such as step out has occurred in the motors 624, 724 based on the detection results by the potentiometers 634, 734. Further, the abnormality determination unit 95 determines whether or not the current position of the image formation unit FU is beyond an assumed movement range and determines whether or not the position is an assumed position based on the detection results of the potentiometers 634, 734. If the abnormality determination unit 95 determines that a failure has occurred in the motors 624, 724, determines that the current position of the image formation unit FU is beyond an assumed movement range, and determines that the position is not an assumed position, the unit determines that an abnormality has occurred.

The abnormality informing unit 96 informs the user that the origin return processing, which will be described later, should be executed if the abnormality determination unit 95 determines that an abnormality has occurred during operation of the posture adjustment device 5 by the operation control unit 94. In addition, the abnormality informing unit 96 informs the details of the abnormality that has occurred in the origin return processing to be described later.

The return operation unit 97 executes the origin return processing if the user performs an operation of executing the origin return processing and returns the image formation unit FU to the original position.

Prescribed Amount Acquisition Processing

Here, the prescribed amount acquisition processing of acquiring the prescribed amounts is explained.

The prescribed amount acquisition processing is processing of acquiring the prescribed amounts to be stored in the prescribed amount memory part 911 performed at the factory shipment of the projector 1 or the like by the preadjustment unit 92. Note that, when the prescribed amount acquisition processing is performed, it is necessary that the image formation unit FU is located at the center of the assumed movement range (the center of the rotation range around the rotation axis Ry and the center of the rotation range around the rotation axis Rx), i.e., in the original position.

The prescribed amount acquisition processing includes first prescribed amount acquisition processing of acquiring the first prescribed amount used in first origin return processing of returning the image formation unit FU to the original position within the rotation range around the rotation axis Ry and second prescribed amount acquisition processing of acquiring the second prescribed amount used in second origin return processing of returning the image formation unit FU to the original position within the rotation range around the rotation axis Rx. That is, the prescribed amount acquisition processing includes the first prescribed amount acquisition processing of operating the first rotation part 6 and acquiring the first prescribed amount and the second prescribed amount acquisition processing of operating the second rotation part 7 and acquiring the second prescribed amount. In the embodiment, these first origin return processing and second origin return processing are simultaneously executed, however, one of the first origin return processing and the second origin return processing may be executed first and the other may be executed later.

As below, the first prescribed amount acquisition processing will be explained, and the explanation of the second prescribed amount acquisition processing will be omitted because the same processing as the first prescribed amount acquisition processing is executed in the second prescribed amount acquisition processing though the objects of operation and the objects of abnormality determination are different.

Figure 18:
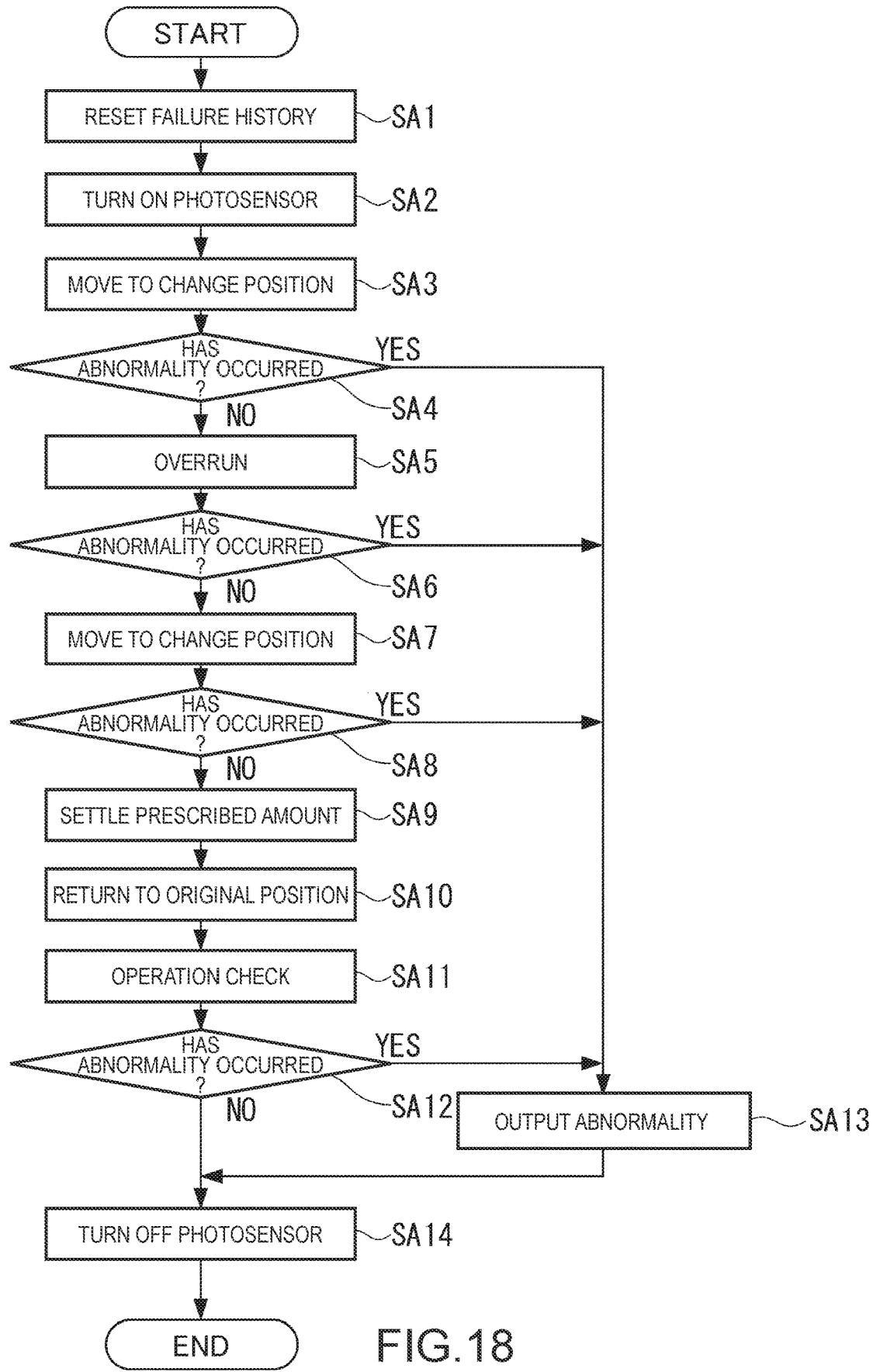
FIG. 18 is a flowchart showing first prescribed amount acquisition processing in the embodiment.

FIG. 18 is a flowchart showing the first prescribed amount acquisition processing.

As shown in FIG. 18, in the first prescribed amount acquisition processing, first, the preadjustment unit 92 initializes the details of abnormalities (error codes) stored as a failure history in the abnormality memory part 912 (step SA1).

Then, the preadjustment unit 92 turns on the power of the photosensor 633 to activate the photosensor 633 (step SA2).

Then, the preadjustment unit 92 drives the motor 624 to rotate the shaft member 632 so that the light shielding portion 6321 of the shaft member 632 may be located in the change position where the shielded state and the non-shielded state are switched (step SA3).

Figure 19:
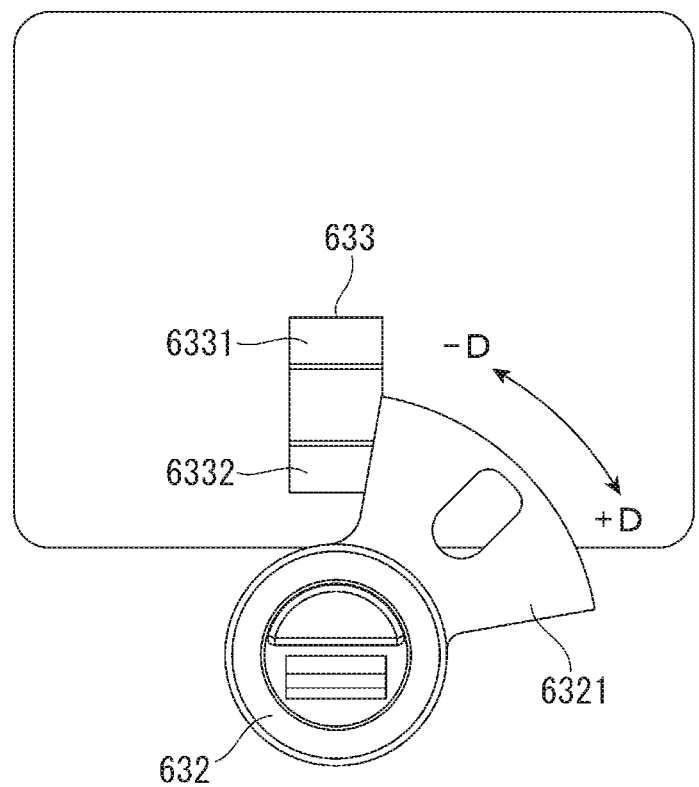
FIG. 19 shows a positional relationship between a photosensor and a light shielding portion in the embodiment.

FIG. 19 shows a positional relationship between the photosensor 633 and the light shielding portion 6321.

When the step SA3 is performed, in the first rotation part 6, as shown in FIG. 19, in the case where the light shielding portion 6321 is not located between the light receiving portion 6331 and a light emitting portion 6332 (in the case of the non-shielded state in which the output voltage from the photosensor 633 is low), the preadjustment unit 92 drives the motor 624 to rotate the shaft member 632 in a −D-direction as a direction in which the light shielding portion 6321 shields the light receiving portion 6331.

On the other hand, in the case where the light shielding portion 6321 is located between the light receiving portion 6331 and the light emitting portion 6332 (in the case of the shielded state in which the output voltage from the photosensor 633 is high), the preadjustment unit 92 drives the motor 624 to rotate the shaft member 632 in a +D-direction as a direction in which the light shielding portion 6321 does not shield the light receiving portion 6331.

By the shaft member 632 rotated as described above, the position of the shaft member 632 when the light receiving portion 6331 changes from the non-shielded state to the shielded state or the position of the shaft member 632 when the portion changes from the shielded state to the non-shielded state is the above described change position.

At the step SA3, the preadjustment unit 92 stores the number of steps of the motor 624 until the shaft member 632 reaches the change position from the original position and the rotation direction of the shaft member 632 (drive direction of the motor 624).

When the step SA3 is performed, the preadjustment unit 92 determines whether or not a failure such as step out has occurred in the motor 624 and an abnormality has occurred in the photosensor 633 or potentiometer 634 (step SA4).

In the determination processing, if the preadjustment unit 92 determines that at least one of these abnormalities has occurred (step SA4: YES), the unit moves the processing to step SA13.

On the other hand, in the determination processing, if the preadjustment unit 92 determines that none of the abnormalities has occurred (step SA4: NO), the unit moves the processing to step SA5.

At step SA5, the preadjustment unit 92 drives the motor 624 to rotate the shaft member 632 by a predetermined amount with the light receiving portion 6331 remaining in the shielded state, and allows the light shielding portion 6321 to overrun from the change position (step SA5). Specifically, the preadjustment unit 92 rotates the shaft member 632 from the state located in the change position in the −D-direction by a predetermined amount (e.g. 40 steps).

When the step SA5 is performed, the preadjustment unit 92 determines whether or not an abnormality (including the above described failure) has occurred like the above described step SA4 (step SA6).

In the determination processing, if the preadjustment unit 92 determines that an abnormality has occurred (step SA6: YES), the unit moves the processing to step SA13.

On the other hand, in the determination processing, if the preadjustment unit 92 determines that an abnormality has not occurred (step SA6: NO), the unit moves the processing to step SA7.

At step SA7, the preadjustment unit 92 drives the motor 624 to reverse the rotation direction of the shaft member 632 to the rotation direction of the shaft member 632 at the step SA5 and position the shaft member 632 (light shielding portion 6321) in the change position (step SA7). In this regard, the preadjustment unit 92 stores the number of steps of the motor 624 when the shaft member 632 reaches the change position from the position before the step SA7 (the position of overrun at step SA5).

When step SA7 is performed, the preadjustment unit 92 determines whether or not an abnormality has occurred in the first rotation part 6 (step SA8) like the above described steps SA4, SA6.

In the determination processing, if the preadjustment unit 92 determines that an abnormality has occurred (step SA8: YES), the unit moves the processing to step SA13.

On the other hand, in the determination processing, if the preadjustment unit 92 determines that an abnormality has not occurred (step SA8: NO), the unit moves the processing to step SA9.

At the step SA9, the preadjustment unit 92 settles the prescribed amounts based on the numbers of steps of the motors 624, 724 at steps SA3, SA5, SA7 (step SA9).

For example, positive and negative signs according to the rotation directions of the shaft member 632 are attached to the numbers of steps of the motor 624 at steps SA3, SA5, SA7. For example, at step SA3, when the shaft member 632 is rotated in the −D-direction by the steps st3, the number of steps at the step SA3 is "−st3". Further, at step SA5, when the shaft member 632 is rotated in the −D-direction by the steps st5, the number of steps at the step SA5 is "−st5". On the other hand, at step SA7, when the shaft member 632 is rotated in the +D-direction by the steps st7, the number of steps at the step SA7 is "+st7". Then, the preadjustment unit 92 sums all of the numbers of steps at these steps SA3, SA5, SA7 and multiplies the sum by "−1", and settles the obtained value as the prescribed amount. For instance, in the above described example, the prescribed amount is "−((−st3)+(−st5)+(+st7))".

When the settled prescribed amount is a negative number, the position of the shaft member 632 rotated in the −D-direction from the change position by the number of steps according to the absolute value of the prescribed amount is the original position for the shaft member 632, and the position of the image formation unit FU in this state is the original position in the rotation range around the rotation axis Ry for the image formation unit FU. Further, if the settled prescribed amount is a positive number, the position of the shaft member 632 rotated in the +D-direction from the change position by the number of steps according to the absolute value of the prescribed amount is the original position for the shaft member 632, and the position of the image formation unit FU in this state is the original position in the rotation range around the rotation axis Ry for the image formation unit FU.

At step SA10, the preadjustment unit 92 drives the motor 624 based on the prescribed amount settled at step SA9, and returns the light combining device 456 (image formation unit FU) to the above described original position (step SA10).

When these steps SA9 to SA11 are performed, the preadjustment unit 92 determines whether or not an abnormality has occurred in the first rotation part 6 (step SA12) like the above described steps.

In the determination processing, if the preadjustment unit 92 determines that an abnormality has occurred (step SA12: YES), the unit moves the processing to step SA13.

On the other hand, in the determination processing, if the preadjustment unit 92 determines that an abnormality has not occurred (step SA12: NO), the preadjustment unit 92 moves the processing to step SA14.

At step SA13, the preadjustment unit 92 outputs the details of the abnormality that has occurred by the abnormality output unit 93 (step SA13). Specifically, at step SA13, the preadjustment unit 92 allows the abnormality memory part 912 to store an error code according to the details of the abnormality that has occurred and allows the abnormality output unit 93 to output the error code and a message representing that the abnormality has occurred to outside (e.g. a display device connected to the control device 9). Thereby, these message and error code are displayed. The error code includes error codes representing respective abnormalities of the motor 624, the potentiometer 634, and the photosensor 633.

After the step SA13, the preadjustment unit 92 moves the processing to step SA14.

At step SA14, the preadjustment unit 92 turns off the photosensor 633 (step SA14). Thereby, the first prescribed amount acquisition processing is ended.

Further, in the same manner as that of the first prescribed amount acquisition processing, the preadjustment unit 92 executes the second prescribed amount acquisition processing using the second rotation part 7.

The prescribed amounts acquired by execution of the first prescribed amount acquisition processing and the second prescribed amount acquisition processing (first prescribed amount and second prescribed amount) are stored in the prescribed amount memory part 911, and read and used in the origin return processing.

Origin Return Processing

The abnormality determination unit 95 of the control device 9 monitors the operation of the posture adjustment device 5 by the operation control unit 94 according to the operation by the user.

If a failure such as step out of the motors 624, 724 and a malfunction of the potentiometers 634, 734 occurs or the current posture of the image formation unit FU is lost due to a power failure, an abnormality that the image formation unit FU moves beyond the assumed movement range or the image formation unit FU is not positioned in a target posture may occur.

If the abnormality determination unit 95 determines that such an abnormality has occurred based on the detection results of the potentiometers 634, 734, the abnormality informing unit 96 outputs a message prompting the user to execute the origin return processing to the image projection device 4. Thereby, an image containing the message is formed and displayed by the image projection device 4. In response to the message, the user performs an operation of executing the origin return processing on an operation unit (not shown), and the control device 9 executes the following origin return processing.

Further, the control device 9 executes the origin return processing when the power of the projector 1 is turned on and off, and determines whether or not a predetermined condition is satisfied constantly or at predetermined intervals and executes origin return processing if the device determines that the predetermined condition is satisfied.

The origin return processing is processing of returning the image formation unit FU to the original position executed by the return operation unit 97. The origin return processing includes first origin return processing and second origin return processing, and the first origin return processing is processing of returning the image formation unit FU to the original position within the rotation range around the rotation axis Ry by the first rotation part 6 and the second origin return processing is processing of returning the image formation unit FU to the original position within the rotation range around the rotation axis Rx by the second rotation part 7. Note that, in the embodiment, the return operation unit executes origin return processing performed using the rotation part in which the abnormality determination unit 95 determines that an abnormality has occurred of the first origin return processing and the second origin return processing. For example, if a determination that an abnormality has occurred in the first rotation part 6 is made, the return operation unit 97 executes the first origin return processing. However, the return operation unit 97 may respectively execute the first origin return processing and the second origin return processing if a determination that an abnormality has occurred is made and if an operation of executing origin return processing is performed by the user. In this regard, the first origin return processing and the second origin return processing may be simultaneously executed or one of the first origin return processing and the second origin return processing may be executed first and the other may be executed later.

As below, the case where the return operation unit executes the first origin return processing will be explained, and the explanation of the second origin return processing will be omitted because the same processing as the first origin return processing is executed in the second origin return processing for the configuration of the second rotation part 7 though the objects of operation and the objects of abnormality determination are different.

Figure 20:
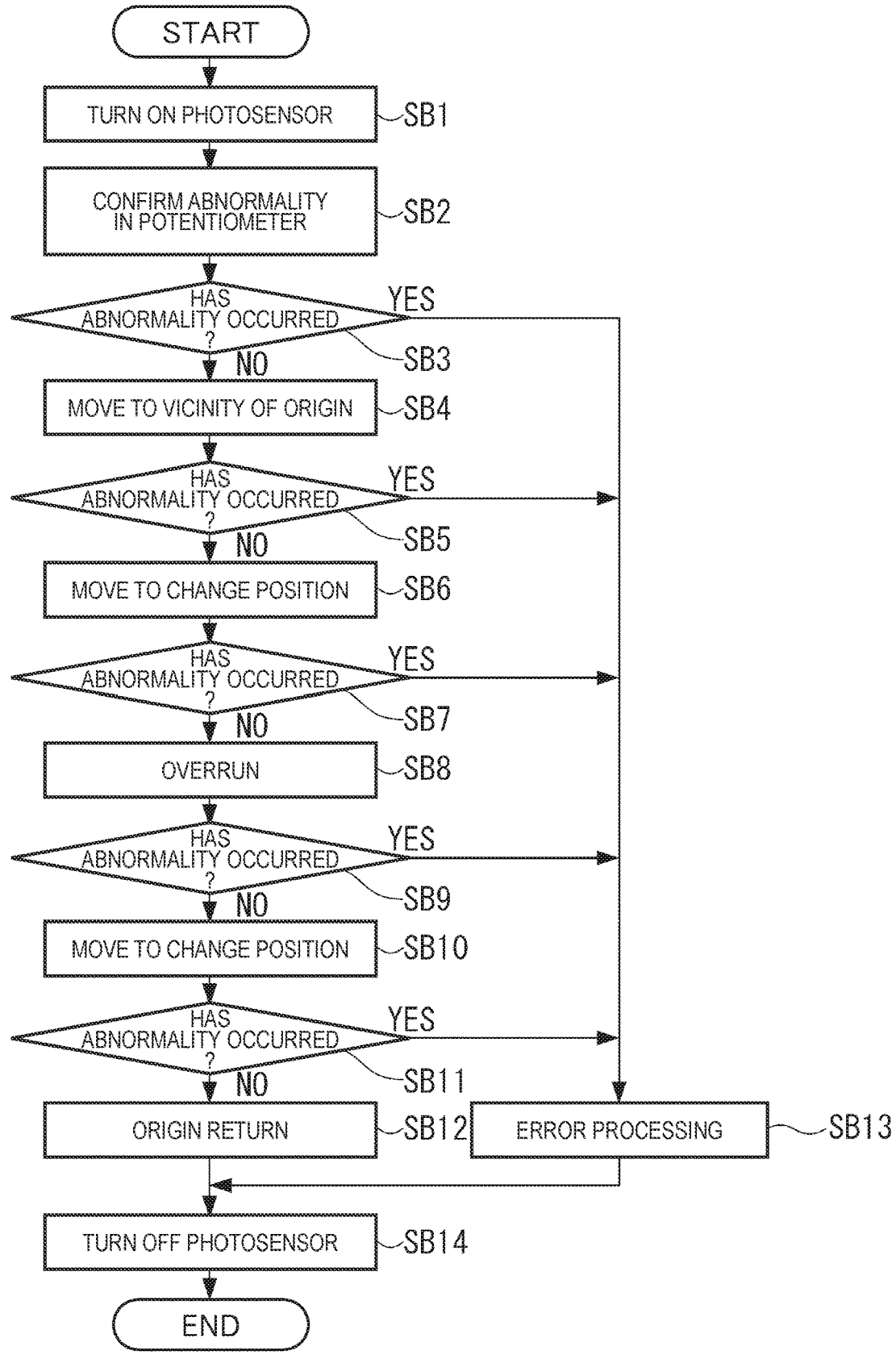
FIG. 20 is a flowchart showing first origin return processing in the embodiment.

FIG. 20 is a flowchart showing the first origin return processing.

As shown in FIG. 20, in the first origin return processing, first, the return operation unit 97 turns on the power of the photosensor 633 to activate the photosensor 633 (step SB1).

Further, the return operation unit 97 drives the motor 624 relatively largely to confirm whether or not an abnormality has occurred in the potentiometer 634 (step SB2). For example, the return operation unit 97 drives the motor 624 to the degree that the shielded state and the non-shielded state of the light receiving portion 6331 are switched by the light shielding portion 6321.

When the step SB2 is performed, the return operation unit 97 determines whether or not an abnormality has occurred in the motor 624 and the potentiometer 634 based on the detection result by the potentiometer 634 (the output voltage value from the potentiometer 634) (step SB3). For example, when there is no change in the output voltage value from the potentiometer 634 even when the motor 624 is driven or when the output voltage value is an abnormal value, the possibility that an abnormality has occurred in the potentiometer 634 or the possibility that an abnormality has occurred in the motor 624 and the motor 624 stops is considered.

If the return operation unit 97 determines that such an abnormality has occurred (step SB3: YES), the return operation unit 97 moves the processing to step SB13.

On the other hand, in the determination processing at step SB3, if the return operation unit 97 determines that an abnormality has not occurred (step SB3: NO), the return operation unit 97 drives the motor 624 to move the image formation unit FU to a vicinity of the original position based on the output voltage value from the potentiometer 634 (step SB4).

Then, the return operation unit 97 determines whether or not an abnormality has occurred in the photosensor 633 (step SB5). For example, if the above described steps SB2, SB4 are executed, the motor 624 is driven to the degree that the shielded state and the non-shielded state of the light receiving portion 6331 are switched, the output voltage value from the potentiometer 634 is normal, but there is no change in the output signal level from the photosensor 633, the possibility that an abnormality has occurred in the photosensor 633 is considered.

In the determination processing at the step SB5, if the return operation unit 97 determines that an abnormality has occurred in the photosensor 633 (step SB5: YES), the return operation unit 97 moves the processing to step SB13. In this state, the image formation unit FU is rotated to the vicinity of the original position through the operation of the first rotation part 6 by the return operation unit 97 based on the detection result of the potentiometer 634.

On the other hand, in the determination processing at the step SB5, if the return operation unit 97 determines that an abnormality has not occurred (step SB5: NO), the return operation unit 97 drives the motor 624 to move the shaft member 632 to the above described change position based on the detection result of the photosensor 633 (the output signal level) (step SB6: change position movement procedure).

When the step SB6 is performed, the return operation unit 97 determines whether or not an abnormality has occurred in the operation of the first rotation part 6 (step SB7).

In the determination processing at the step SB7, if the return operation unit 97 determines that an abnormality has occurred (step SB7: YES), the return operation unit 97 moves the processing to step SB13.

On the other hand, in the determination processing, if the return operation unit 97 determines that an abnormality has not occurred (step SB7: NO), the return operation unit 97 moves the processing to step SB8.

At step SB8, the return operation unit 97 drives the motor 624 to rotate the shaft member 632 in the −D-direction by a predetermined amount with the light receiving portion 6331 remaining in the shielded state, and allows the light shielding portion 6321 to overrun from the change position in the −D-direction (step SB8: predetermined amount rotation procedure) like the above described step SA5.

When the step SB8 is performed, the return operation unit 97 determines whether or not an abnormality has occurred in the operation of the first rotation part 6 (step SB9) like the above described step SB7. If the unit determines that an abnormality has occurred (step SB9: YES), the unit moves the processing to step SB13, and, if the unit determines that an abnormality has not occurred (step SB9: NO), the unit moves the processing to step SB10.

At step SB10, the return operation unit 97 drives the motor 624 to reverse the rotation direction of the shaft member 632 and positions the shaft member 632 in the change position based on the detection result by the photosensor 633 (step SB10) like the above described step SA7 (step SB10: reverse movement procedure).

When step SB10 is performed, the return operation unit 97 determines whether or not an abnormality has occurred in the operation of the first rotation part 6 (step SB11) like the above described steps SA7, SA9. If the unit determines that an abnormality has occurred (step SB11: YES), the unit moves the processing to step SB13, and, if the unit determines that an abnormality has not occurred (step SB11: NO), the unit moves the processing to step SB12.

At step SB12, the return operation unit 97 drives the motor 624 to return the shaft member 632 and thus the image formation unit FU to the respective original positions based on the prescribed amount (first prescribed amount) stored in the above described prescribed amount memory part 911 (step SB12: origin return procedure). Then, the return operation unit 97 moves the processing to step SB14.

The step SB13 is performed if a determination that an abnormality has occurred is made at the steps SB3, SB5, SB7, SB9, SB11. At the step SB13, the control device 9 executes error processing (step SB13). For example, at the step SB13, the abnormality informing unit 96 informs the user of a message representing that an abnormality has occurred in the posture adjustment device 5 (the first rotation part 6 in the first origin return processing) using the image projection device 4, or the operation control unit 94 restricts the operation of the posture adjustment device 5 so that the user can not use the posture adjustment device 5.

Then, the control device 9 moves the processing to step SB14.

At step SB14, the return operation unit 97 turns off the photosensor 633 (step SB14). Thereby, the origin return processing is ended.

In the above described first origin return processing, the image formation unit FU may be returned to the original position in the rotation range around the rotation axis Ry using the first prescribed amount acquired in the above described first prescribed amount acquisition processing, and the posture of the image formation unit FU may be returned to the original.

Note that, though the explanation is omitted, the return operation unit 97 executes the second origin return processing, and thereby, the image formation unit FU may be returned to the original position in the rotation range around the rotation axis Rx, and the posture of the image formation unit FU may be returned to the original.

According to the projector 1 of the above described embodiment, the following advantages may be offered.

If a failure such as step out occurs in the motor 624 and the image formation unit FU is rotated beyond the assumed range, the control device 9 may grasp these abnormalities based on the detection results by the potentiometer 634. If the abnormality determination unit 95 determines that the abnormality has occurred, the return operation unit 97 executes the origin return processing (first origin return processing) to grasp the rotation state of the shaft member 632 to which the rotation of the lead screw 626 is transmitted based on the detection result by the photosensor 633, and returns the image formation unit FU to the original position. Accordingly, the above described abnormalities and the rotation state of the shaft member 632 may be detected by the relatively inexpensive potentiometer without using an absolute encoder, and the image formation unit FU may be accurately returned to the original position based on the detection result by the relatively inexpensive and highly accurate photosensor 633. Therefore, if an abnormality occurs, the image formation unit FU as an object of movement may be reliably returned to the original position, and further, the manufacturing cost of the projector 1 may be suppressed. The same advantages may be offered in the case where the abnormality determination unit 95 determines that a failure or an abnormality has occurred in the operation of the second rotation part 7 and the return operation unit 97 executes the above described second origin return processing.

In the first origin return processing, at step SB12, the return operation unit 97 drives the motor 624 as the driver so that the shaft member 632 located in the change position may rotate by the first prescribed amount, and thereby, returns the image formation unit FU (light combining device 456) to the original position. Accordingly, the image formation unit FU may be reliably returned to the original position. The same advantage is offered in the second origin return processing.

In the first origin return processing, the return operation unit 97 positions the shaft member 632 in the change position at step SB6, and then, executes the above described steps SB8, SB10 to make a to-and-fro rotation of the shaft member 632. Accordingly, for example, regardless of the rotation direction of the shaft member 632 reaching the change position at step SB6, detection variations of the photosensor 633 depending on the rotation direction (operation direction), rotation variations of the shaft member 632 depending on the driven direction (rotation direction), and further, backlash may be suppressed. Further, at step S12, the shaft member 632 is rotated from the change position in the opposite direction to the rotation direction of the shaft member 632 at step SB6 by the prescribed amount (first prescribed amount), and thereby, the image formation unit FU may be reliably returned to the original position in the range of the rotation around the rotation axis Ry. The same advantage is offered in the second origin return processing.

In the first origin return processing, at step SB6, the return operation unit 97 positions the shaft member 632 in the change position based on the detection result by the photosensor 633, and then, executes the above described steps SB8, SB10. Accordingly, the shaft member 635 may be accurately placed in the change position based on the detection result of the photosensor 633, and the image formation unit FU may be accurately returned to the original position. The same advantage is offered in the second origin return processing.

In the first origin return processing, before positioning the shaft member 632 in the change position at step SB6, the return operation unit 97 drives the motor 624 to position the image formation unit FU to the vicinity of the original position based on the detection result by the potentiometer 634 at step SB4. Accordingly, even in a configuration in which an abnormality occurs in the photosensor 633 and the return operation unit 97 does not perform the steps SB6 to SB12, the image formation unit FU may be positioned to the vicinity of the original position based on the detection result by the potentiometer 634. Therefore, the projector 1 may be used with the image formation unit FU located in the vicinity of the original position.

The control device 9 has the prescribed amount memory part 911 that stores the above described prescribed amounts, and the return operation unit 97 acquires the prescribed amounts stored in the prescribed amount memory part 911 in the origin return processing (the first prescribed amount in the first origin return processing, the second prescribed amount in the second origin return processing) and performs origin return of the image formation unit FU at step SB12. Accordingly, the above described prescribed amounts are stored in the prescribed amount memory part 911 in advance by the above described prescribed amount acquisition processing (first prescribed amount acquisition processing and second prescribed amount acquisition processing) or the like, and thereby, the image formation unit FU may be reliably returned to the original position.

If the return operation unit 97 determines that an abnormality has occurred during execution of origin return processing, the unit stores the details of the abnormality that has occurred in the abnormality memory part 912. Accordingly, the cause of the abnormality that has occurred may be easily analyzed.

The original position is the center position in the movement range (the rotation range around the rotation axis Ry and the rotation range around the rotation axis Rx) of the image formation unit FU by the posture adjustment device 5. Accordingly, the image formation unit FU may be reliably returned to the state before posture adjustment by the posture adjustment device 5.

The posture adjustment device 5 has the first pulleys 628, 728 integrally provided to the lead screws 626, 726, the second pulleys 631, 731 integrally provided to the shaft members 632, 732, and the timing belts 629, 729 as the transmission members that transmit the rotations of the first pulleys 628, 728 to the second pulleys 631, 731. Accordingly, the rotations of the lead screws 626, 726 are transmitted to the shaft members 632, 732 via the first pulleys 628, 728, the timing belts 629, 729, and the second pulleys 631, 731, and the rotations of the shaft members 632, 732 are detected by the photosensors 633, 733 and the potentiometers 634, 734. Accordingly, the amounts of rotation of the lead screws 626, 726 that change the posture of the image formation unit FU may be reliably detected by the photosensors 633, 733 and the potentiometers 634, 734 placed in the positions apart from the lead screws 626, 726. Therefore, the degree of freedom of placement of the photosensors 633, 733 and the potentiometers 634, 734 may be improved.

The second pulleys 631, 731 increase the speeds of the rotations of the first pulleys 628, 728 transmitted via the timing belts 629, 729. Accordingly, the rotation states of the shaft members 632, 732 may be easily detected by the photosensors 633, 733 and the potentiometers 634, 734, and the detection accuracy of the rotation states of the lead screws 626, 726 and thus the posture of the image formation unit FU may be improved. Therefore, the posture of the image formation unit FU as an object of posture adjustment may be detected in more detail.

The first rotation part 6 has the plurality of sensors including the photosensor 633 and the potentiometer 634 as the rotation detection part, and may isolate the abnormality of the motor 624 and the abnormality of the photosensor 633 and the potentiometer 634. Further, as shown by the step SB6, even in the case where an abnormality has occurred in the photosensor 633, if no abnormality has occurred in the motor 624 and the potentiometer 634, the motor 624 may be driven to move the image formation unit FU to the vicinity of the original position based on the detection result by the potentiometer 634. Furthermore, steps SB6, SB8, SB10, SB12 do not require the detection result of the potentiometer 634, and thereby, even in the case where an abnormality has occurred in the potentiometer 634, the image formation unit FU may be returned to the original position based on the detection result of the photosensor 633, and the projector 1 may be used with the image formation unit FU located in the original position. The same advantage is offered in the second rotation part 7 and in the second origin return processing using the second rotation part 7.

Note that a procedure without execution of the steps SB6 to SB12 of returning the image formation unit FU to the original position may be taken if an abnormality has occurred in the photosensor 633, even if an abnormality has not occurred in the potentiometer 634.

Modifications of Embodiment

The invention is not limited to the above described embodiment, but the invention includes modifications, improvements, etc. within the range in which the purpose of the invention may be achieved.

In the above described embodiment, for example, if a determination that an abnormality has occurred in the posture adjustment device 5 is made, the control device 9 displays the message prompting performance of the origin return processing and executes the origin return processing according to the operation by the user. However, the control device 9 (return operation unit 97) may be adapted, if the abnormality determination unit 95 determines that an abnormality has occurred, to autonomously execute the origin return processing. Note that, obviously, the origin return processing may be performed at any time desired by the user.

In the above described embodiment, in the first origin return processing, the return operation unit 97 moves the image formation unit FU to the vicinity of the original position based on the detection result by the potentiometer 634, then, moves the shaft member 632 to the change position, allows the shaft member 632 to overrun, further moves (reversely moves) the shaft member 632 to the change position based on the detection result by the photosensor 633, and then, moves the shaft member to the original position. However, the return operation unit 97 does not necessarily move the image formation unit FU to the vicinity of the original position based on the detection result by the potentiometer 634 (i.e., step SB4). Or, the return operation unit 97 does not necessarily allow the shaft member 632 to overrun or further move the shaft member to the change position. The same applies to the second origin return processing.

In the above described embodiment, at step SA5 in the first prescribed amount acquisition processing and step SB8 in the first origin return processing, when the light shielding portion 6321 is overrun, the shielded state of the photosensor 633 is maintained by the light shielding portion 6321. However, the light shielding portion 6321 (shaft member 632) may be rotated in the direction in which the photosensor 633 comes into the non-shielded state. That is, the light shielding portion 6321 (shaft member 632) placed in the change position may make to-and-fro rotation at steps SA5, SA7 and steps SB8, SB10. Further, even when the drive direction of the motor 624 (the rotation direction of the shaft member 632) becomes opposite, the to-and-fro rotation may be omitted as long as the amount of rotation of the shaft member 632 is the same at the same number of steps. The same applies to the second prescribed amount acquisition processing and the second origin return processing.

In the above described embodiment, the prescribed amounts are stored in the prescribed amount memory part 911 and read from the prescribed amount memory part 911 when the origin return processing is performed. However, the prescribed amounts may be input by the user or the like or externally acquired as appropriate. Further, the prescribed amount acquisition processing is not necessarily performed if the prescribed amounts can be acquired.

In the above described embodiment, the control device 9 has the abnormality memory part 912 in which error codes indicating the details of abnormalities are stored. The abnormality memory part 912 is not necessarily formed using a nonvolatile memory such as a flash memory, but may be formed using a volatile memory such as a RAM. That is, the error codes are not necessarily permanently held. Or, a configuration that externally outputs an error code if a determination that an abnormality has occurred is made may be employed. Or, the details of abnormalities may be held as other information than the error codes.

In the above described embodiment, the original position of the image formation unit FU is the center of the movement range of the image formation unit FU (the center of the rotation range around the rotation axis Ry and the center of the rotation range around the rotation axis Rx). However, the original position may be any predetermined position. For example, the original position may be one end in the movement range.

In the above described embodiment, the posture adjustment device 5 has the first pulleys 628, 728 integrally provided with the lead screws 626, 726, the second pulleys 631, 731 integrally provided with the shaft members 632, 732, and the timing belts 629, 729 that transmit the rotations of the first pulleys 628, 728 to the second pulleys 631, 731. However, the mechanisms and configurations that transmit the rotations of the lead screws 626, 726 to the shaft members 632, 732 can be changed as appropriate as long as the shaft members 632, 732 rotate according to the rotations of the lead screws 626, 726.

Further, as long as the photosensors 633, 733 and the potentiometers 634, 734 can be placed, they may be adapted to directly detect the rotation states of the lead screws 626, 726.

In the above described embodiment, the second pulleys 631, 731 increase the speeds of the rotations of the first pulleys 628, 728, however, the second pulleys 631, 731 do not necessarily increase the speeds of the rotations. Or, another pully may be provided between the first pulley and the second pulley and the rotation of the first pulley may be transmitted to the second pulley via the other pulley.

In the above described embodiment, the first rotation part 6 of the posture adjustment device 5 has the timing belt 629 as the transmission member that transmits the rotation of the first pulley 628 to the second pulley 631, and further has the tensioner 630 that presses the timing belt 629. However, the transmission member may have another configuration than the timing belt 629, e.g. a chain. Or, the tensioner 630 is not necessarily provided and any other configuration that may suppress slack of the transmission member such as a timing belt may be employed.

The same applies to the timing belt 729 and the tensioner 730 of the second rotation part 7.

In the above described embodiment, the posture adjustment device 5 includes the motors 624, 724 driven according to the control signals input from the control device 9 as drivers, and the motors 624, 724 are formed using stepping motors. However, the motors 624, 724 may be motors having other configurations or other actuators may be employed in place of the motors 624, 724.

In the above described embodiment, the posture adjustment device 5 includes the second rotation part 7 that rotates the image formation unit FU around the rotation axis Rx parallel to the +X-direction and the first rotation part 6 that rotates the image formation unit FU around the rotation axis Ry parallel to the +Y-direction. However, the posture adjustment device may be any device that rotates the image formation unit FU around at least one of the rotation axes Rx, Ry. That is, one of the first rotation part 6 and the second rotation part 7 is not necessarily provided. Or, the rotation axis of the image formation unit FU is not necessarily parallel to the +X-direction or +Y-direction.

In the above described embodiment, the projector 1 includes the three light modulation devices 452 (452B, 452G, 452R). However, the invention can be applied to any projector including two or more light modulation devices and a light combining device that combines the lights output from the light modulation devices.

In the above described embodiment, the image projection device 4 has the configuration in which the above described optical components are placed in the positions shown in FIG. 1. However, the optical components forming the image projection device 4 and the layout of the optical components can be changed as appropriate.

In the above described embodiment, the light modulation device 452 has the transmissive liquid crystal panel 454 having the different light incident surface and light exiting surface. However, the light modulation device may have a reflective liquid crystal panel having a surface serving as both a light incident surface and a light exiting surface. Or, any other light modulation device that can modulate incident luminous fluxes and form an image according to image information using a micromirror such as e.g. DMD (Digital Micromirror Device) than the liquid crystal device may be used. In this case, in place of the three light modulation devices 452, three light modulation devices respectively formed using DMDs may be employed for the projector 1.

The entire disclosure of Japanese Patent Application No. 2017-189828, filed on Sep. 29, 2017 is expressly incorporated by reference herein.

What is claimed is:

1. A projector comprising:
 a light source;
 a plurality of light modulation devices that respectively modulate lights output from the light source;
 a light combining device integrated with the plurality of light modulation devices and combining the lights entering from the respective plurality of light modulation devices;
 a projection optical device that projects the light combined in the light combining device;
 a posture adjustment device that adjusts a posture of the light combining device; and
 a control device that controls operation of the posture adjustment device,
 the posture adjustment device including
  a lead screw that changes the posture of the light combining device,
  a driver that rotates the lead screw,
  a shaft member to which a rotation of the lead screw is transmitted,
  a potentiometer that detects an amount of rotation of the shaft member, and a photosensor including a light receiving portion that may be shielded according to a rotation of the shaft member by a light shielding portion provided in the shaft member, and the control device including an abnormality determination unit that determines whether or not an abnormality has occurred in the posture adjustment device based on a detection result by the potentiometer, and a return operation unit that, if the abnormality determination unit determines that an abnormality has occurred, drives the driver and returns the light combining device to an original position based on a detection result by the photosensor.

2. The projector according to claim 1, wherein the return operation unit drives the driver to execute an origin return procedure of moving the light combining device to the original position by rotating the shaft member by a prescribed amount as a prescribed amount of rotation from a change position where a shielded state in which the light receiving portion is shielded by the light shielding portion of the shaft member and a non-shielded state in which the light receiving portion is not shielded are switched.

3. The projector according to claim 2, wherein the return operation unit executes a predetermined amount rotation procedure of rotating the shaft member by a predetermined amount of rotation, and a reverse movement procedure of reversing a direction of the rotation of the shaft member and positioning the shaft member in the change position based on the detection result by the photosensor after the predetermined amount rotation procedure, and the unit executes the origin return procedure after execution of the reverse movement procedure.

4. The projector according to claim 3, wherein the return operation unit executes a change position movement procedure of positioning the shaft member in the change position based on the detection result by the photosensor, and the unit executes the predetermined amount rotation procedure after execution of the change position movement procedure.

5. The projector according to claim 4, wherein the return operation unit drives the driver to position the light combining device to a vicinity of the original position based on the detection result by the potentiometer before the change position movement procedure.

6. The projector according to claim 2, wherein the control device includes a prescribed amount memory part that stores the prescribed amount, and the return operation unit acquires the prescribed amount stored in the prescribed amount memory part and executes the origin return procedure.

7. The projector according to claim 1, wherein the control device includes an abnormality memory part that stores details of an abnormality that has occurred, and if a determination that an abnormality has occurred in the posture adjustment device is made, the return operation unit stores details of the abnormality that has occurred in the abnormality memory part.

8. The projector according to claim 1, wherein the original position is a center position in a movement range of the light combining device by the posture adjustment device.

9. The projector according to claim 1, wherein the posture adjustment device includes a first pulley integrally provided to the lead screw,
a second pulley integrally provided to the shaft member, and a transmission member that transmits a rotation of the first pulley to the second pulley.

10. The projector according to claim 9, wherein the second pulley increases a speed of the rotation of the first pulley transmitted via the transmission member.

11. A control method executed by a control device of a projector, the projector including a light source,
a plurality of light modulation devices that respectively modulate lights output from the light source,
a light combining device integrated with the plurality of light modulation devices and combining the lights entering from the respective plurality of light modulation devices,
a projection optical device that projects the light combined in the light combining device,
a posture adjustment device that adjusts a posture of the light combining device, and
a control device that controls operation of the posture adjustment device, the posture adjustment device including a lead screw that changes the posture of the light combining device,
a driver that rotates the lead screw,
a shaft member to which a rotation of the lead screw is transmitted,
a potentiometer that detects an amount of rotation of the shaft member, and
a photosensor including a light receiving portion that may be shielded according to a rotation of the shaft member by a light shielding portion provided in the shaft member, and the control method comprising:

determining whether or not an abnormality has occurred in the posture adjustment device based on a detection result by the potentiometer; and if a determination that the abnormality has occurred is made, driving the driver and returning the light combining device to an original position based on a detection result by the photosensor.

12. A control method executed by a control device of a projector, the projector including a light source,
a plurality of light modulation devices that respectively modulate lights output from the light source,
a light combining device integrated with the plurality of light modulation devices and combining the lights entering from the respective plurality of light modulation devices,
a projection optical device that projects the light combined in the light combining device,
a posture adjustment device that adjusts a posture of the light combining device, and
a control device that controls operation of the posture adjustment device, the posture adjustment device including a lead screw that changes the posture of the light combining device,
a driver that rotates the lead screw,
a shaft member to which a rotation of the lead screw is transmitted,
a potentiometer that detects an amount of rotation of the shaft member, and a photosensor having a light receiving portion that may be shielded according to a rotation of the shaft member by a light shielding portion provided in the shaft member, and the control method comprising returning the light combining device to an original position by rotating the shaft member by a prescribed amount as a prescribed amount of rotation from a change position where a shielded state in which the light receiving portion is shielded by the light shielding portion of the shaft member and a non-shielded state in which the light receiving portion is not shielded are switched based on a detection result by the photosensor.

* * * * *